US012374832B2

(12) United States Patent
Takeuchi et al.

(10) Patent No.: US 12,374,832 B2
(45) Date of Patent: Jul. 29, 2025

(54) SHIELD CONNECTOR WITH OUTER-CONDUCTOR-SIDE CONTACT PORTION CONTACTING HOUSING-SIDE CONTACT PORTION

(71) Applicants: SUMITOMO WIRING SYSTEMS, LTD., Yokkaichi (JP); TOYOTA JIDOSHA KABUSHIKI KAISHA, Toyota (JP)

(72) Inventors: Kazuya Takeuchi, Yokkaichi (JP); Norihito Hashimoto, Yokkaichi (JP); Kazuya Kobayashi, Yokkaichi (JP); Shinobu Wakahara, Toyota (JP)

(73) Assignees: SUMITOMO WIRING SYSTEMS, LTD., Mie (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 18/153,207

(22) Filed: Jan. 11, 2023

(65) Prior Publication Data

US 2023/0246393 A1 Aug. 3, 2023

(30) Foreign Application Priority Data

Jan. 31, 2022 (JP) ................................ 2022-012607

(51) Int. Cl.
*H01R 13/6581* (2011.01)
*H01R 13/02* (2006.01)
(Continued)

(52) U.S. Cl.
CPC ......... *H01R 13/6581* (2013.01); *H01R 13/02* (2013.01); *H01R 13/24* (2013.01);
(Continued)

(58) Field of Classification Search
CPC .... H01R 13/6581; H01R 13/02; H01R 13/24; H01R 13/2442; H01R 13/245;
(Continued)

(56) References Cited

U.S. PATENT DOCUMENTS 5,073,130 A 12/1991 Nakamura
5,456,618 A 10/1995 Nakamura
(Continued)

FOREIGN PATENT DOCUMENTS

CN 211670368 U 10/2020
CN 213184720 U * 5/2021
(Continued)

OTHER PUBLICATIONS

Dec. 6, 2023 Office Action issued in Japanese Patent Application No. 2022-012607.
(Continued)

*Primary Examiner* — Justin M Kratt
(74) *Attorney, Agent, or Firm* — Oliff PLC

(57) ABSTRACT

A shield connector includes an inner conductor, an outer conductor, a dielectric, and a housing. The outer conductor includes an outer-conductor-side contact portion that is disposed behind the housing and faces backward in a coupled state with the housing. The housing includes a housing-side contact portion facing forward in the coupled state with the outer conductor. The outer-conductor-side contact portion and the housing-side contact portion contact each other in the coupled state between the outer conductor and the housing.

4 Claims, 25 Drawing Sheets

(51) Int. Cl.

| | |
|---|---|
| ***H01R 13/24*** | (2006.01) |
| ***H01R 13/40*** | (2006.01) |
| ***H01R 13/428*** | (2006.01) |
| ***H01R 13/432*** | (2006.01) |
| ***H01R 13/502*** | (2006.01) |
| *H01R 12/71* | (2011.01) |
| *H01R 12/72* | (2011.01) |
| *H01R 13/22* | (2006.01) |
| *H01R 13/42* | (2006.01) |
| *H01R 13/514* | (2006.01) |
| *H01R 13/516* | (2006.01) |
| *H01R 13/646* | (2011.01) |
| *H01R 13/648* | (2006.01) |
| *H01R 13/658* | (2011.01) |
| *H01R 13/6585* | (2011.01) |
| *H01R 13/6594* | (2011.01) |
| *H01R 107/00* | (2006.01) |

(52) U.S. Cl.

CPC ....... *H01R 13/2442* (2013.01); *H01R 13/245* (2013.01); *H01R 13/40* (2013.01); *H01R 13/428* (2013.01); *H01R 13/432* (2013.01); *H01R 13/502* (2013.01); *H01R 12/71* (2013.01); *H01R 12/712* (2013.01); *H01R 12/714* (2013.01); *H01R 12/716* (2013.01); *H01R 12/724* (2013.01); *H01R 13/22* (2013.01); *H01R 13/2407* (2013.01); *H01R 13/42* (2013.01); *H01R 13/514* (2013.01); *H01R 13/516* (2013.01); *H01R 13/646* (2013.01); *H01R 13/648* (2013.01); *H01R 13/658* (2013.01); *H01R 13/6585* (2013.01); *H01R 13/6594* (2013.01); *H01R 2107/00* (2013.01)

(58) Field of Classification Search

CPC .... H01R 13/40; H01R 13/428; H01R 13/432; H01R 13/502; H01R 12/71; H01R 12/712; H01R 12/714; H01R 12/716; H01R 12/724; H01R 13/22; H01R 13/2407; H01R 13/42; H01R 13/514; H01R 13/516; H01R 13/648; H01R 13/658; H01R 13/6585; H01R 13/6594; H01R 2107/00; H01R 13/646

See application file for complete search history.

(56) References Cited

U.S. PATENT DOCUMENTS

| | | | |
|---|---|---|---|
| 5,538,440 | A | 7/1996 | Rodrigues et al. |
| 5,564,940 | A | 10/1996 | Rodriques et al. |
| 5,681,180 | A | 10/1997 | Rodrigues |
| 8,740,629 | B1 | 6/2014 | Hall et al. |
| 9,385,480 | B2 | 7/2016 | Miyoshi |
| 10,658,797 | B2 | 5/2020 | Andre et al. |
| 11,545,795 | B2 | 1/2023 | Maejima et al. |
| 11,837,808 | B2 | 12/2023 | Maesoba et al. |
| 2014/0148052 | A1 | 5/2014 | Hall et al. |
| 2015/0024630 | A1 | 1/2015 | Miyoshi |
| 2020/0009279 | A1 | 1/2020 | Janssen |
| 2020/0099174 | A1 | 3/2020 | Andre et al. |
| 2021/0376539 | A1 | 12/2021 | Maejima et al. |
| 2022/0102885 | A1 | 3/2022 | Maesoba et al. |

FOREIGN PATENT DOCUMENTS

| | | | |
|---|---|---|---|
| JP | H05-2387 | U | 1/1993 |
| JP | H07-22064 | Y2 | 5/1995 |
| JP | H07-230833 | A | 8/1995 |
| JP | 2009-123450 | A | 6/2009 |
| JP | 2015-022877 | A | 2/2015 |
| JP | 2015-536554 | A | 12/2015 |
| JP | 2019-516514 | A | 6/2019 |
| JP | 2020-109738 | A | 7/2020 |
| JP | 2021-190228 | A | 12/2021 |

OTHER PUBLICATIONS

Mar. 5, 2024 Office Action issued in Japanese Patent Application No. 2022-012607.

* cited by examiner

SHIELD CONNECTOR WITH OUTER-CONDUCTOR-SIDE CONTACT PORTION CONTACTING HOUSING-SIDE CONTACT PORTION

CROSS-REFERENCE TO RELATED APPLICATION

This application is based on and claims the priority of Japanese Patent Application No. 2022-012607 filed on Jan. 31, 2022, the entire contents of which are incorporated herein by reference.

BACKGROUND OF THE INVENTION

(1) Field of the Invention

The present invention relates to a shield connector.

(2) Description of Related Art

A shield connector generally includes an inner conductor, an outer conductor surrounding the inner conductor, a dielectric disposed between the inner conductor and the outer conductor, and a housing coupled to the outer conductor. The outer conductor prevents leakage of electromagnetic noise from the inner conductor and entrance of electromagnetic noise into the inner conductor. The dielectric is made of synthetic resin, and maintains an insulated state between the inner conductor and the outer conductor.

Structures for fixing two members when coupling the two members are disclosed in JP 2015-536554 A (translation of PCT application), JP 2009-123450 A, and JP H7-230833 A.

SUMMARY OF THE INVENTION

When an elastic lock structure is employed for fixing two members, a lock margin (corresponding to a gap) is required for a rotational displacement of the elastic lock, which may cause rattling of these members.

If the gap corresponding to the lock margin is formed in the shield connector and an outer conductor and a housing rattle due to the gap, high-frequency performance (communication performance) may be affected.

In view of the above, an object of the present disclosure is to provide a shield connector with which rattling between an outer conductor and a housing can be prevented.

A shield connector of the present disclosure is a shield connector including: an inner conductor; an outer conductor that surrounds the inner conductor; a dielectric that is disposed between the inner conductor and the outer conductor; and a housing coupled to the outer conductor. The outer conductor includes an outer-conductor-side contact portion that is disposed behind the housing and faces backward in a coupled state with the housing. The housing includes a housing-side contact portion that faces forward in the coupled state with the outer conductor. The outer-conductor-side contact portion and the housing-side contact portion contact each other in the coupled state between the outer conductor and the housing.

The present disclosure can provide a shield connector with which rattling between an outer conductor and a housing can be prevented.

DETAILED DESCRIPTION OF PREFERRED EMBODIMENTS

Description of Embodiment of Present Disclosure

Figure 1:
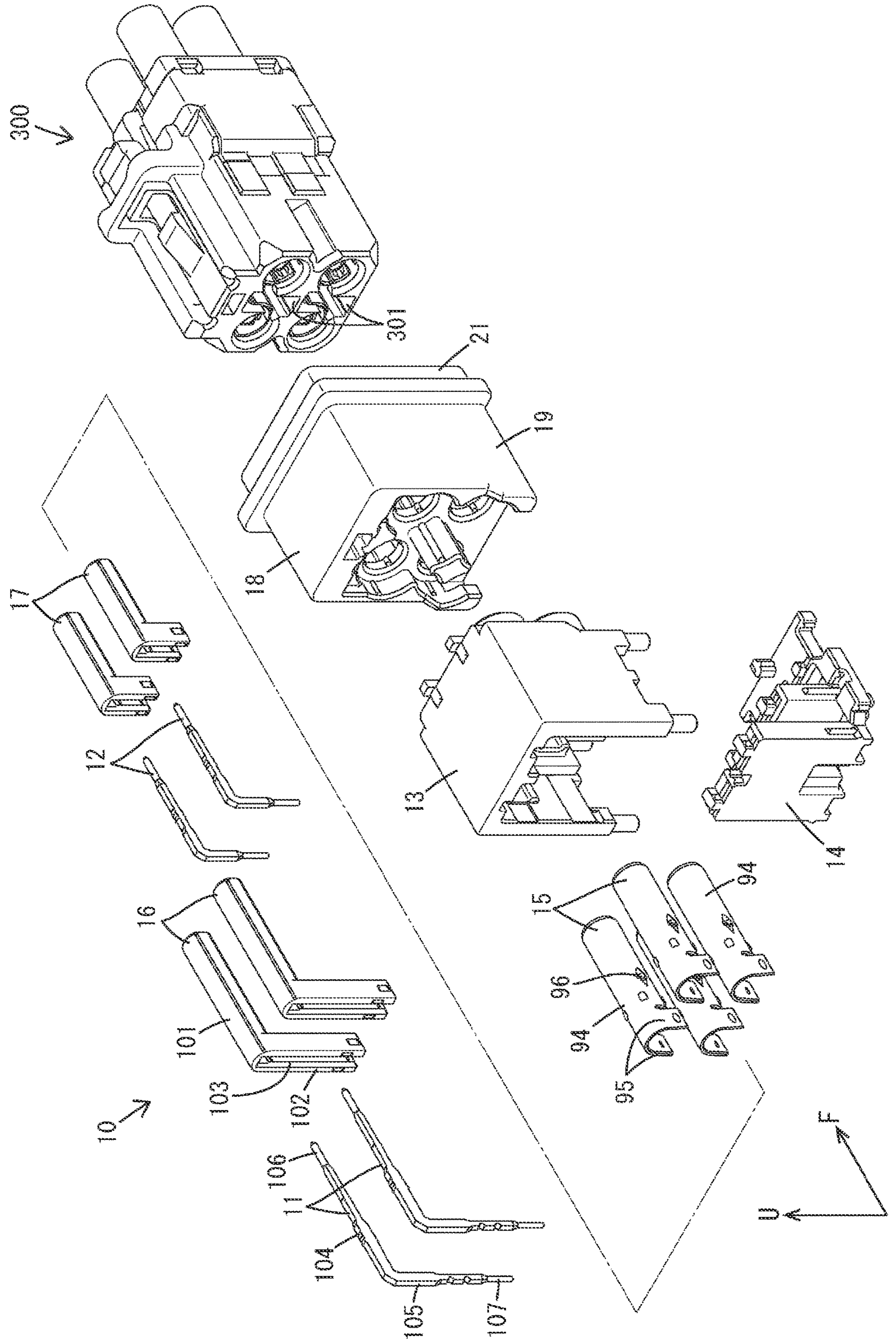
FIG. 1 is an exploded perspective view of a shield connector according to a first embodiment of the present disclosure.

First of all, embodiments of the present disclosure are listed and described.

A shield connector of the present disclosure is (1) a shield connector including: an inner conductor; an outer conductor that surrounds the inner conductor; a dielectric that is disposed between the inner conductor and the outer conductor; and a housing coupled to the outer conductor, wherein the outer conductor includes an outer-conductor-side contact portion that is disposed behind the housing and faces backward in a coupled state with the housing, the housing includes a housing-side contact portion that faces forward in the coupled state with the outer conductor, and the outer-conductor-side contact portion and the housing-side contact portion contact each other in the coupled state between the outer conductor and the housing.

The outer-conductor-side contact portion and the housing-side contact portion are in contact with each other in a coupled state between the outer conductor and the housing. Thus, rattling between the outer conductor and the housing can be prevented, so that the high-frequency performance (communication performance) of the shield connector can be maintained.

(2) Preferably, the outer conductor may include a first outer conductor and a second outer conductor assembled to each other. The first outer conductor and the second outer conductor may include a first outer-conductor-side contact portion and a second outer-conductor-side contact portion, respectively, both of which serve as the outer-conductor-side contact portion. The housing may include a first housing-side contact portion and a second housing-side contact portion that serve as the housing-side contact portion and correspond to the first outer-conductor-side contact portion and the second outer-conductor-side contact portion, respectively. The first outer conductor may be coupled to the housing from a back side, and the second outer conductor is coupled to the housing in a direction intersecting a front and back direction.

The first outer conductor is coupled to the housing from the back side, and the first outer-conductor-side contact portion and the first housing-side contact portion contact each other. Thus, the first outer conductor and the housing are coupled in a state where the rattling is prevented. Furthermore The second outer conductor is coupled to the housing in a direction intersecting the front and back direction, and the second outer-conductor-side contact portion and the second housing-side contact portion contact each other. Thus, the second outer conductor and the housing are coupled in a state where the rattling is prevented. Still furthermore, the first outer conductor and the second outer conductor are assembled to each other. Thus, even when force to separate the first outer conductor and the housing from each other is applied, the coupled state between the second outer conductor and the housing is maintained, and the assembled state between the first outer conductor and the second outer conductor is maintained, with the result that the first outer conductor and the housing can be prevented from being separated from each other. Furthermore, even when force to separate the second outer conductor and the housing from each other is applied, the coupled state between the first outer conductor and the housing is maintained, and the assembled state between the first outer conductor and the second outer conductor is maintained, with the result that the second outer conductor and the housing can be prevented from being separated from each other.

(3) The second outer-conductor-side contact portion may include a pressing rib that is provided on a surface facing the second housing-side contact portion and comes into contact with the second housing-side contact portion.

The pressing rib of the second outer-conductor-side contact portion can continuously press the second housing-side contact portion. This can be more reliably prevent a gap from being produced between the second outer-conductor-side contact portion and the second housing-side contact portion. Here, the second outer conductor is coupled to the housing in a direction intersecting the front and back direction, so that a state where the pressing rib is in contact with the second housing-side contact portion can be easily achieved.

(4) The first outer conductor may include a displacement restriction surface that faces the second housing-side contact portion in a direction in which the second housing-side contact portion is separated from the second outer-conductor-side contact portion.

When force such as vibration force to separate the second housing-side contact portion from the second outer-conductor-side contact portion, the second housing-side contact portion can come into contact with the displacement restriction surface of the first outer conductor. Thus, the state where the second housing-side contact portion and the second outer-conductor-side contact portion are in contact with each other can be stably maintained. In particular, with the configuration described above, the coupling directions of the first outer conductor and the second outer conductor with respect to the housing are different from each other, so that the displacement restriction surface of the first outer conductor can be easily provided at a position facing the second housing-side contact portion.

Detailed Description of Embodiment of Present Disclosure

Specific examples of the present disclosure will be described below with reference to the drawings. Note that the present invention is not limited to the examples, and is expressed by the claims, while including all modifications within the meaning and scope equivalent to the claims.

First Embodiment

Figure 2:
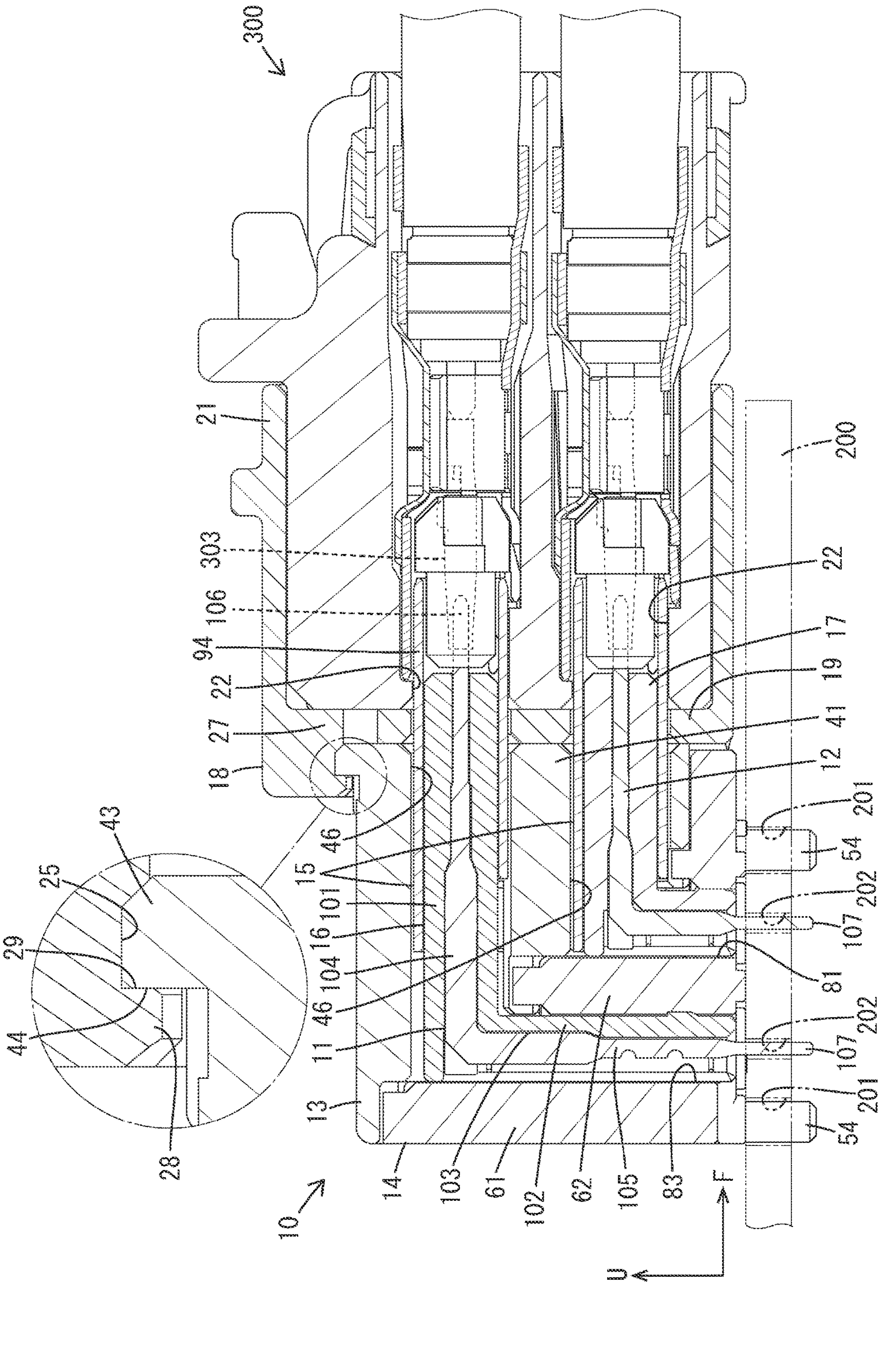
FIG. 2 is a cross-sectional view illustrating a fit state between the shield connector and a mating connector.

A shield connector 10 according to a first embodiment is a shield connector for a board, mounted to a circuit board 200. As illustrated in FIG. 1 and FIG. 2, the shield connector 10 includes inner conductors 11 and 12, outer conductors 13, 14, and 15 surrounding the outer circumference of the inner conductors 11 and 12, dielectrics 16 and 17 disposed between the inner conductors 11 and 12 and the outer conductors 13, 14, and 15, and a housing 18 to which the outer conductors 13, 14, and 15 are coupled.

The outer conductors 13, 14, and 15 and the inner conductors 11 and 12 are conductive members made of metal or the like. The dielectrics 16 and 17 and the housing 18 are insulating members made of synthetic resin or the like. The housing 18 is fit to a mating connector 300. In the following description, regarding a front and back direction, the side where the housing 18 faces the mating connector 300 at the time of fitting is defined as the front side. Regarding an up and down direction, the side where the shield connector 10 is mounted on the circuit board 200 is defined as the upper side. This upper side is the upper side in FIG. 1 and FIG. 2. In FIG. 1 and FIG. 2, the upper side is denoted by a reference sign "U", and the front side is denoted by a reference sign "F". In the following description, a left and right direction is a direction intersecting the front and back direction and the up and down direction, and corresponds to a width direction.

Housing

Figure 14:
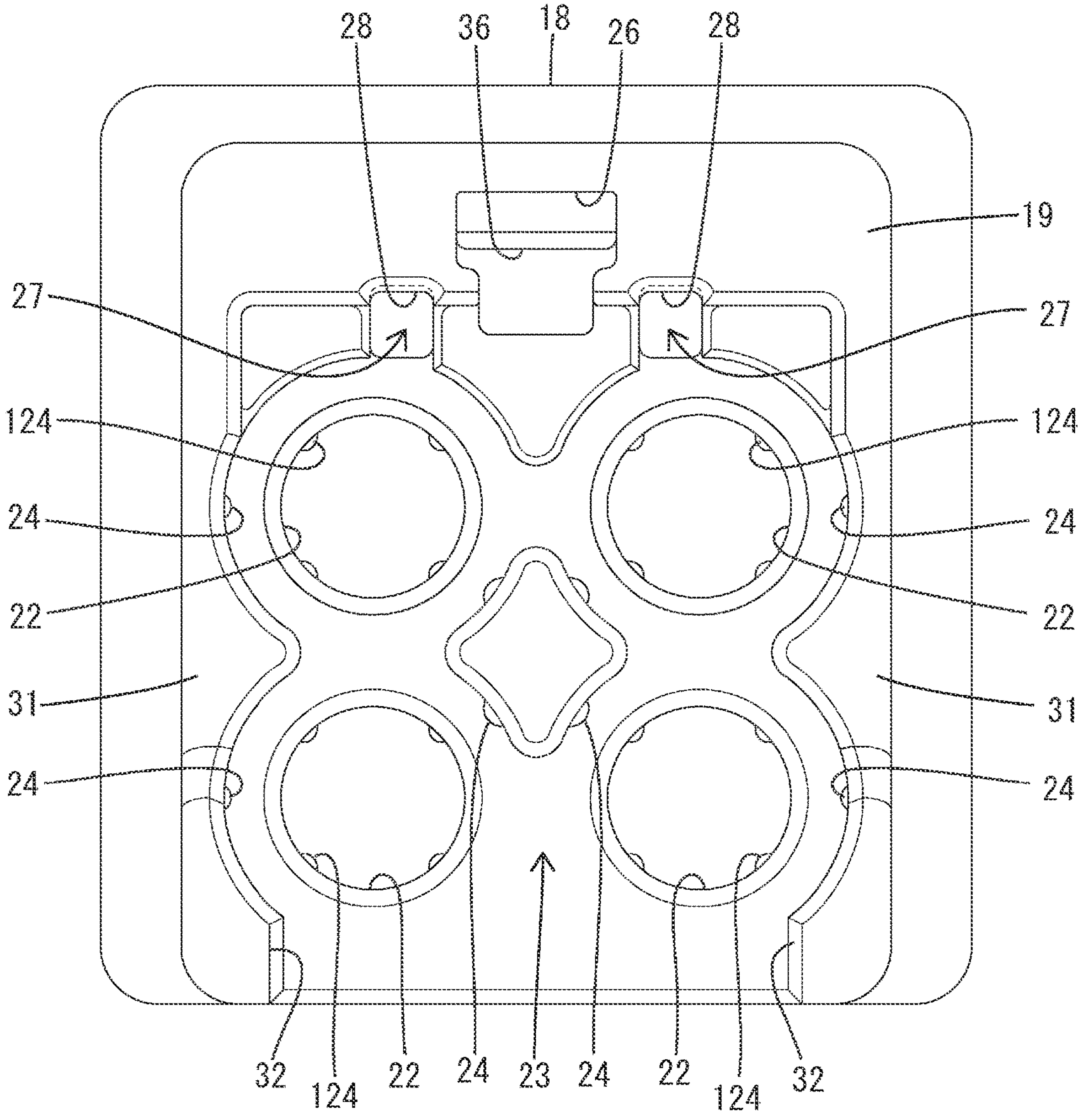
FIG. 14 is a back view of the housing.
Figure 17:
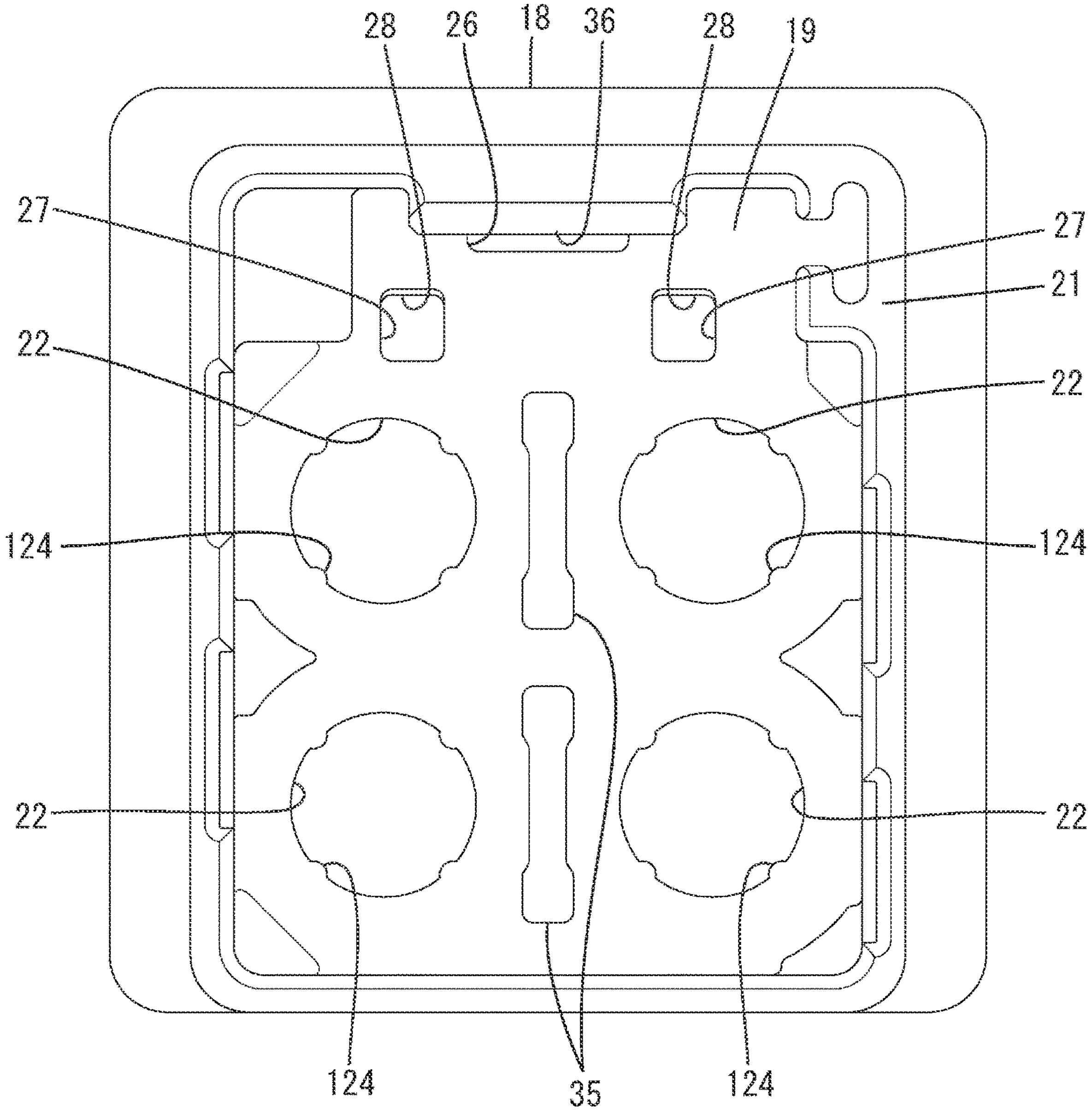
FIG. 17 is a front view of the housing.

As illustrated in FIG. 1, the housing 18 has a rectangular outer shape as a whole, and includes a housing body 19 and a hood 21 protruding forward from the housing body 19. As illustrated in FIG. 14 and FIG. 17, the housing body 19 has a plurality of insertion holes 22, the number of which is four in the present first embodiment, penetrating in the front and back direction. The insertion holes 22 have a circular cross-sectional shape, are paired in the up and down direction, and are arranged side by side in the width direction.

Figure 6:
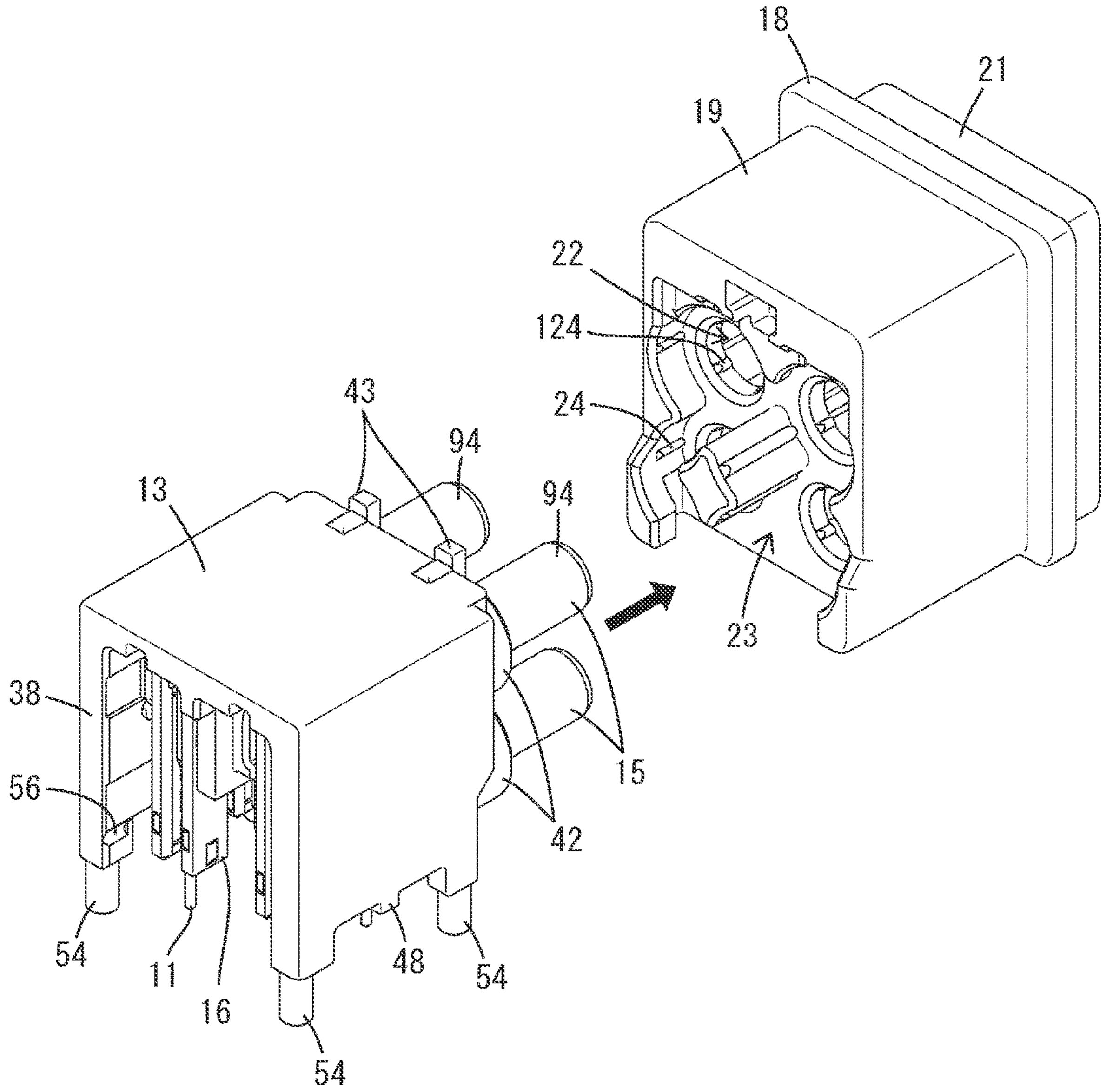
FIG. 6 is a perspective view illustrating a process of assembling the first outer conductor to a housing.

A fitting recess 23 having a shape recessed with the center portion of the housing body 19 remaining, is formed in a back surface of the housing body 19 as illustrated in FIG. 14. A plurality of in-recess ribs 24 are formed in an inner circumferential surface of the fitting recess 23. A plurality of in-hole ribs 124 are formed in an inner circumferential surface of each insertion hole 22. As illustrated in FIG. 6, each of the in-recess ribs 24 and each of the in-hole ribs 124 are formed so as to extend in the front and back direction on the inner circumferential surface of the fitting recess 23 and the inner circumferential surface of a corresponding one of the insertion holes 22, respectively. As illustrated in FIG. 2, outer conductor tubes 15 described below are inserted in the insertion holes 22 of the housing body 19. Although not shown in the figure, tube portions 42 of a first outer conductor 13 described below are inserted in the fitting recess 23 of the housing body 19 (see FIG. 6). Each of the in-recess ribs 24 and each of the in-hole ribs 124 come into contact with the outer circumference surface of the tube portion 42 and the outer circumference surface of the outer conductor tube 15, respectively.

As illustrated in FIG. 14 and FIG. 17, a mold release recess 26 is formed in an upper end portion of the housing body 19. The mold release recess 26 is formed when a mold for molding a housing lock portion 36 described below is pulled out. In the upper end portion of the housing body 19, a pair of fitting holes 27 are formed on both left and right sides of the mold release recess 26. Each of the fitting holes 27 is formed through the upper end portion of the housing body 19 in the front and back direction, and communicates with the inside of the fitting recess 23 and the hood 21.

Figure 7:
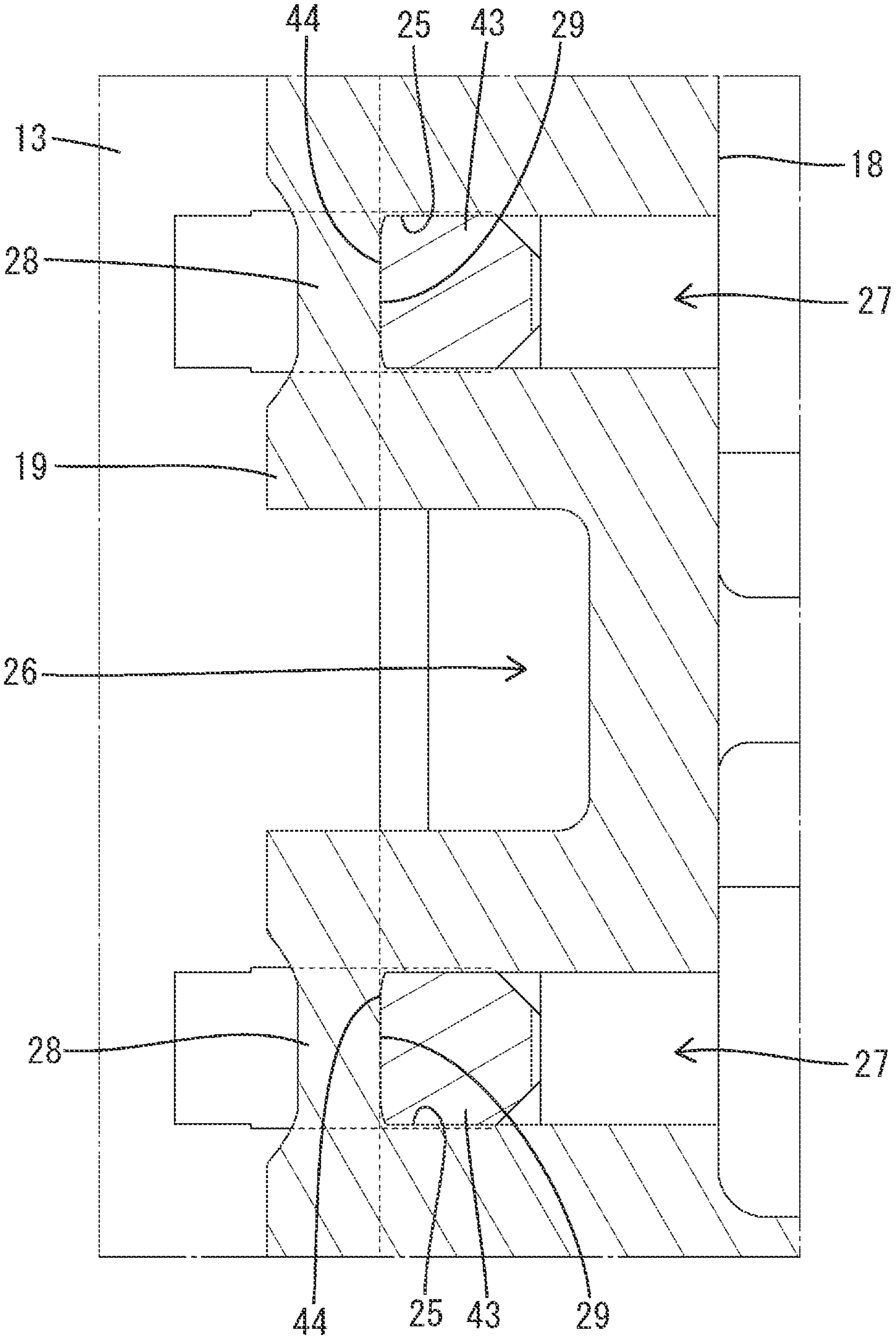
FIG. 7 is a partially enlarged cross-sectional view illustrating a contact state between a first outer-conductor-side contact portion and a first housing-side contact portion.
Figure 15:
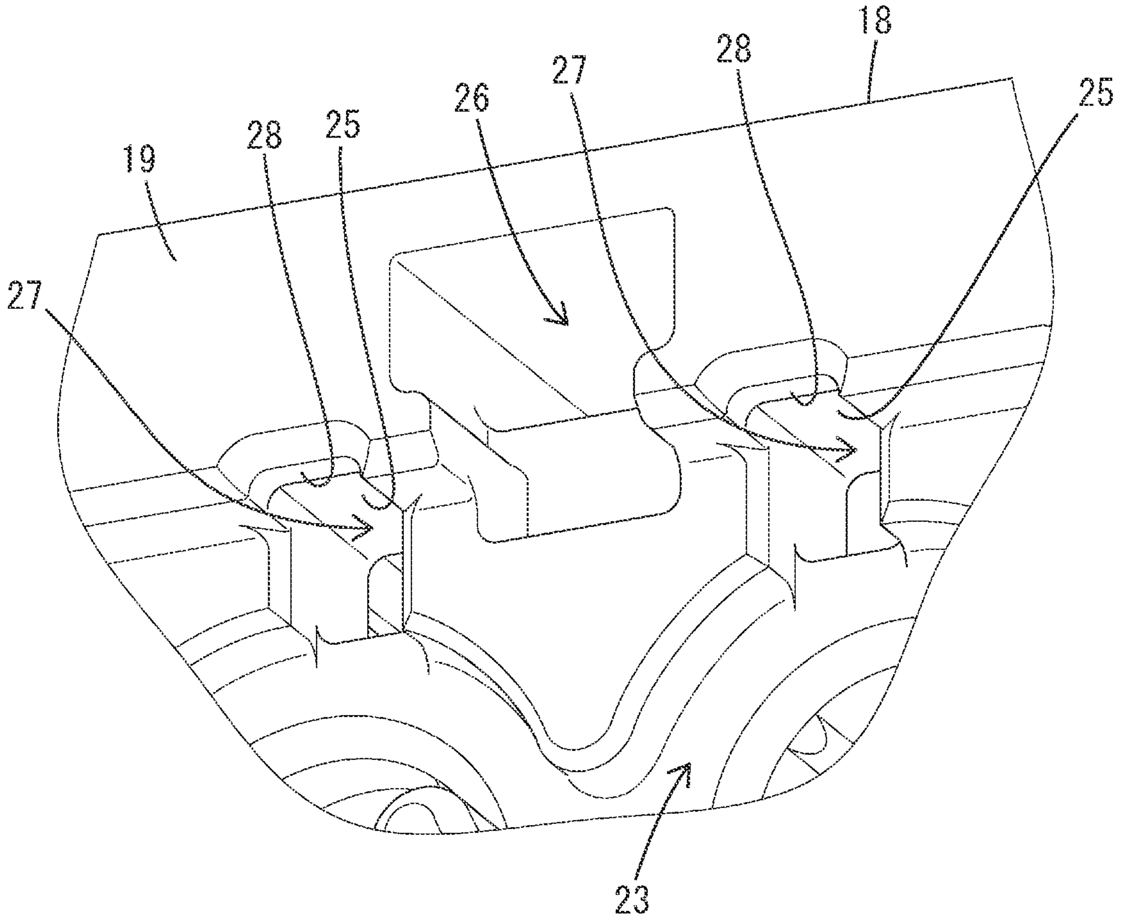
FIG. 15 is a partially enlarged perspective view illustrating the first housing-side contact portion and a peripheral structure thereof.

As illustrated in FIG. 15, a pair of recessed grooves 25 corresponding to back end portions of the fitting holes 27 are formed as recesses in an upper end portion of the inner circumferential surface of the fitting recess 23. A pair of first locking protrusions 28 are formed at the back end of the housing body 19, to extend in the width direction across the recessed grooves 25. Each of the first locking protrusions 28 faces the back surface of the housing body 19 and protrudes toward the fitting recess 23. As illustrated in FIG. 7, a front surface (a surface facing forward side) of each of the first locking protrusions 28 serves as a first housing-side contact portion 29 extending along the width direction.

As illustrated in FIG. 2 and FIG. 7, a first coupling protruding portion 43 of the first outer conductor 13 described below is press fit into the recessed groove 25 of the housing body 19 in a wedging manner, and a first outer-conductor-side contact portion 44 described below is brought into contact with the first housing-side contact portion 29.

As illustrated in FIG. 14, the housing body 19 includes a pair of housing side portions 31 that define both left and right sides of the fitting recess 23. A pair of second locking protrusions 32 are formed on the inner surfaces (surfaces facing each other) on the lower end of the respective housing side portions 31 to protrude toward the fitting recess 23.

Figure 16:
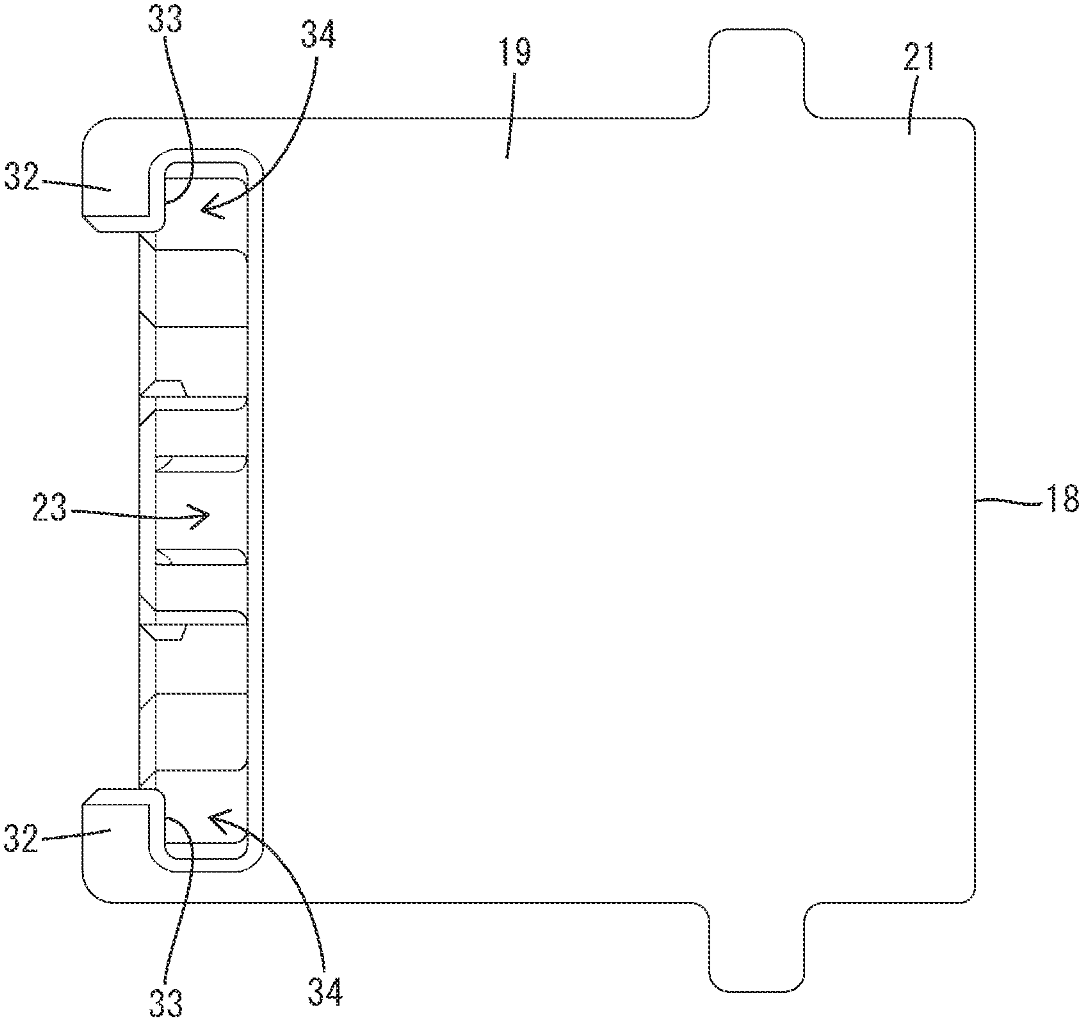
FIG. 16 is a bottom view of the housing.

As illustrated in FIG. 16, a front surface (a surface facing forward) of the second locking protrusion 32 serves as a second housing-side contact portion 33 extending along the width direction. In the housing body 19, a pair of fitting grooves 34 are formed between the second housing-side contact portions 33 of the second locking protrusions 32 and an innermost surface of the fitting recess 23 that faces the second locking protrusions 32 on the front side. Each of the fitting grooves 34 is opened in the up and down direction and to the inner side in the width direction between the second locking protrusions 32 and the innermost surface of the fitting recess 23.

Figure 10:
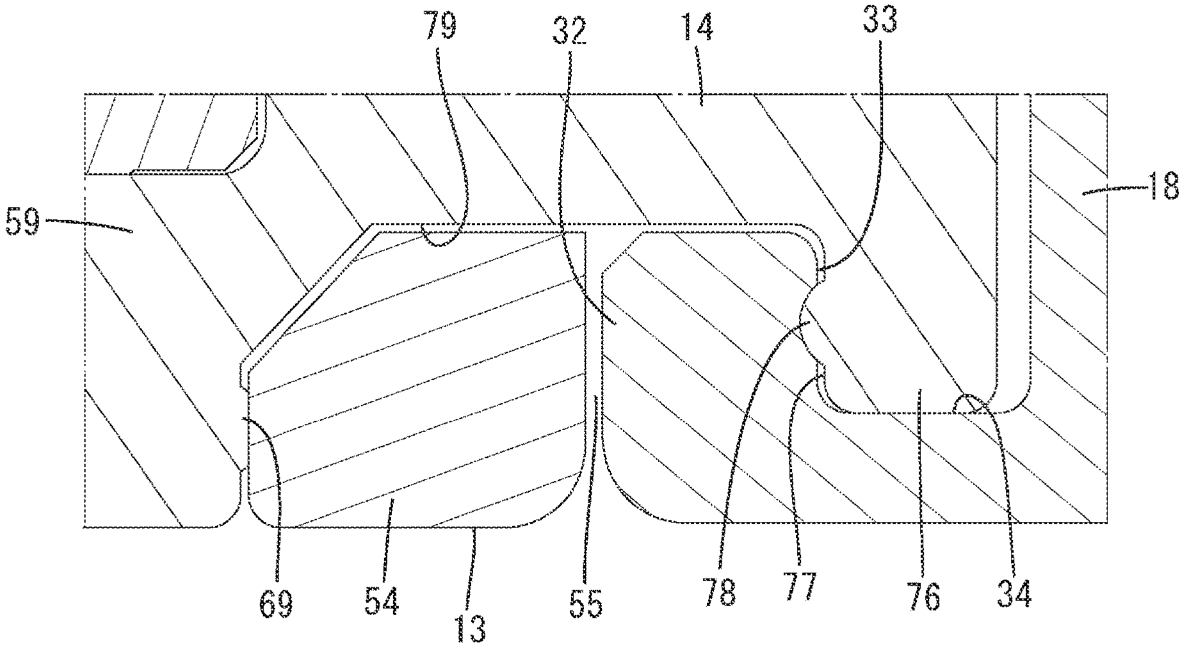
FIG. 10 is a partially enlarged cross-sectional view illustrating a contact state between a second outer-conductor-side contact portion and a second housing-side contact portion.

As illustrated in FIG. 10, a second coupling protruding portion 76 of a second outer conductor 14 described below is inserted in the fitting groove 34 of the housing body 19 from the lower side. A pressing rib 78 of a second outer-conductor-side contact portion 77 described below is brought into contact with the second housing-side contact portion 33 in a pressed manner.

The hood 21 has a rectangular tube shape. As illustrated in FIG. 2, the mating connector 300 is inserted and fit in the hood 21. As illustrated in FIG. 17, in the hood 21, a pair of partition portions 35 are formed to protrude forward from the front surface of the housing body 19. Each of the partition portions 35 is inserted into a space 301 (see FIG. 1) formed in the mating connector 300. A housing lock portion 36 for locking the mating connector 300 is formed on an upper wall of the hood 21. The housing lock portion 36 locks the mating connector 300, and thereby the housing 18 and the mating connector 300 are held in the fit state.

Outer Conductor

As illustrated in FIG. 1 and FIG. 2, the outer conductor includes the first outer conductor 13, the second outer conductor 14, and a plurality of the outer conductor tubes 15. The first outer conductor 13 and the second outer conductor 14 are die-cast conductive rigid bodies made of a zinc alloy, an aluminum alloy, or the like, obtained by casting, and are formed of the same material. The first outer conductor 13 and the second outer conductor 14 are assembled to each other to form a single casing. The outer conductor tube 15 is a press formed body obtained by bending a metal plate material made of a material such as brass having higher hardness than the first outer conductor 13 and the second outer conductor 14.

Figure 8:
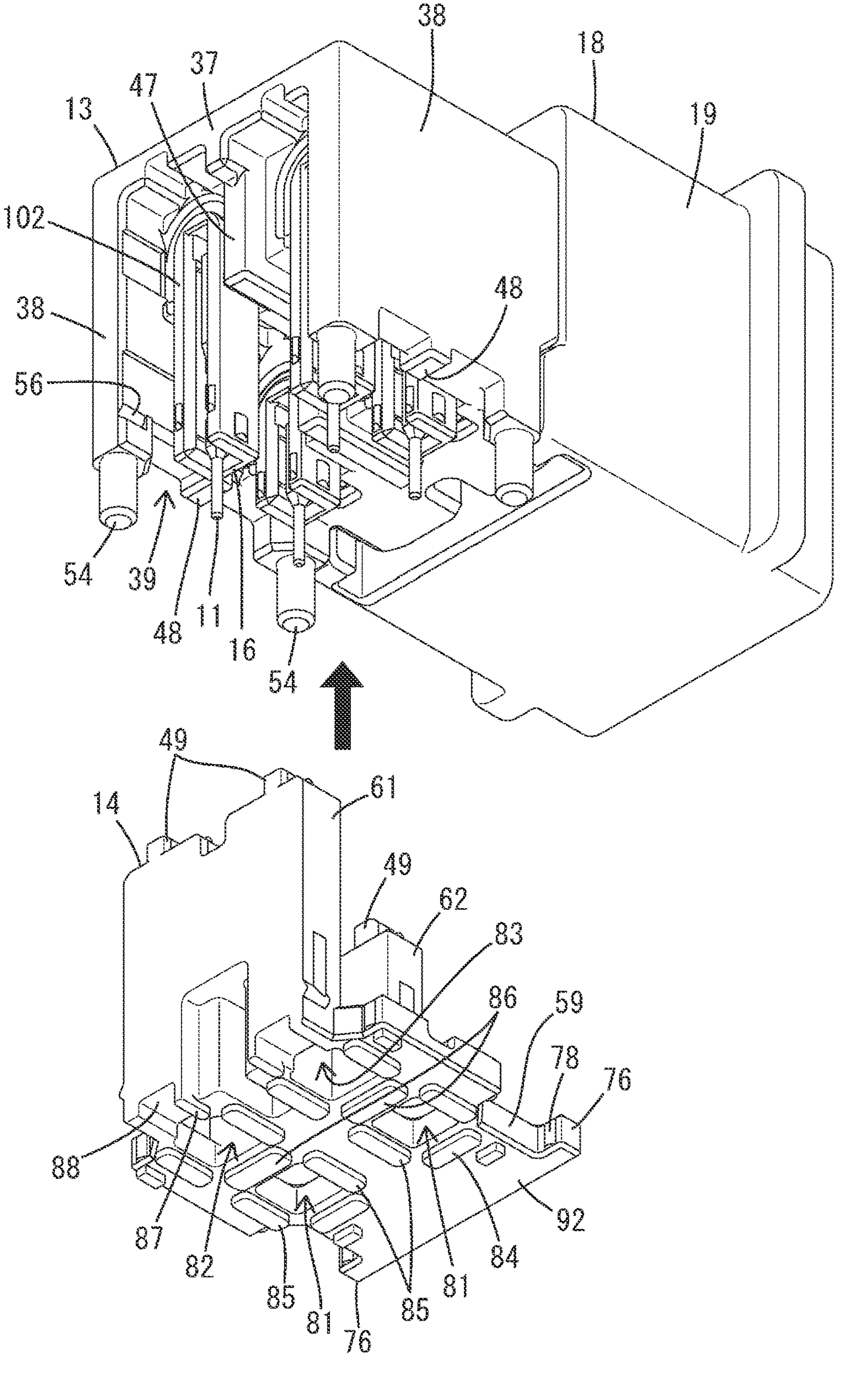
FIG. 8 is a perspective view illustrating a process of assembling the second outer conductor to the first outer conductor.
Figure 18:
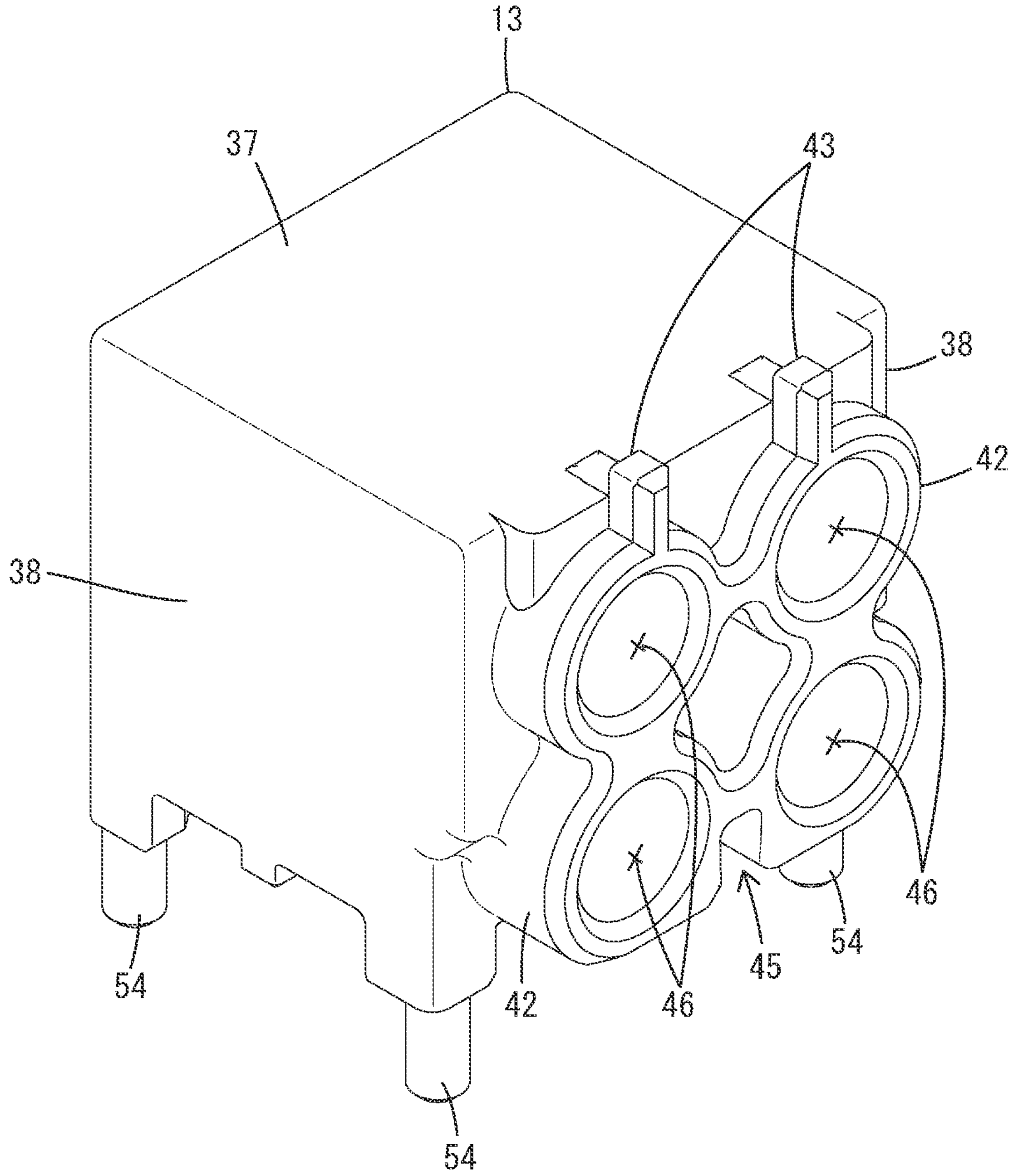
FIG. 18 is a perspective view of the first outer conductor.
Figure 19:
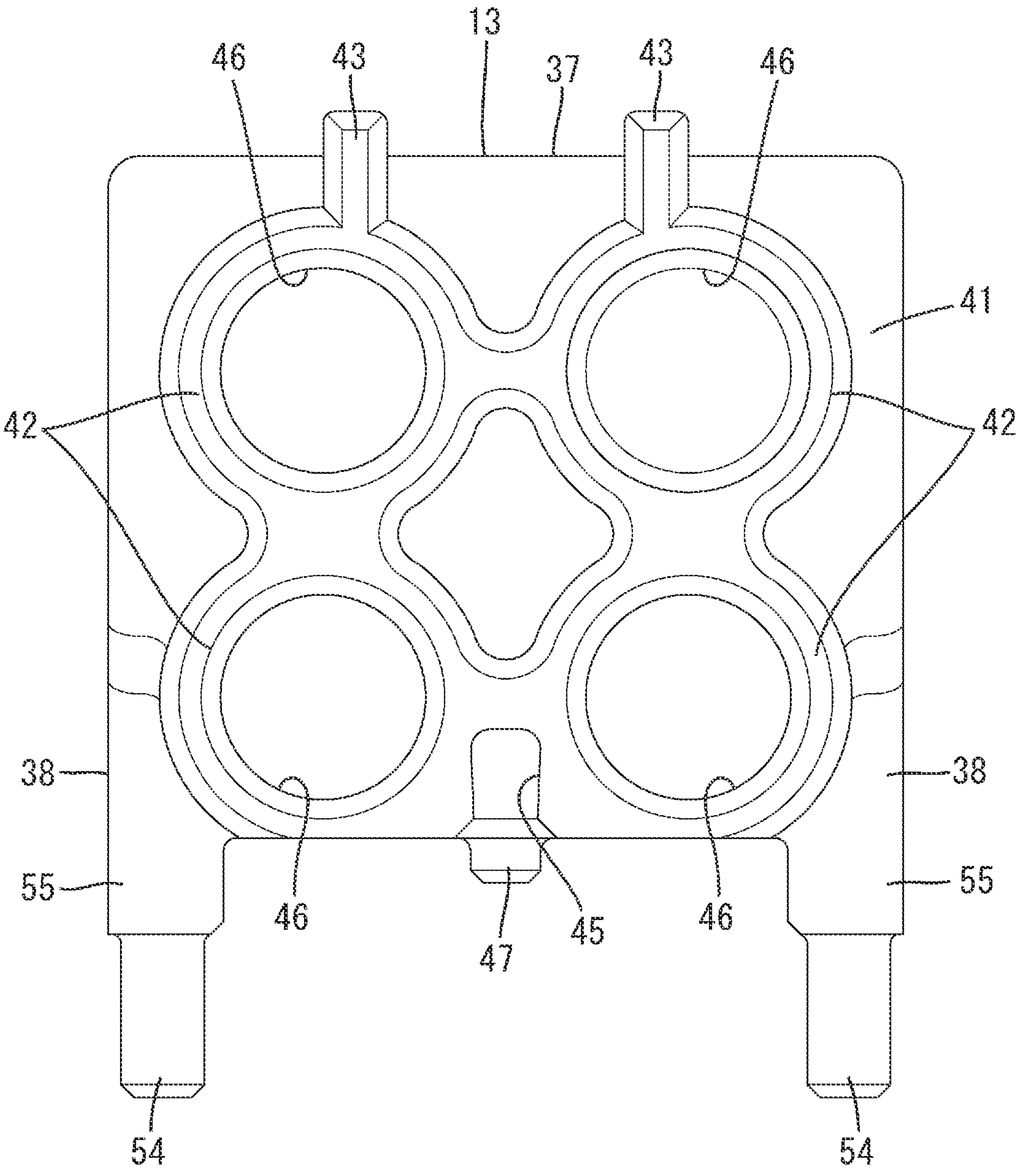
FIG. 19 is a front view of the first outer conductor.
Figure 20:
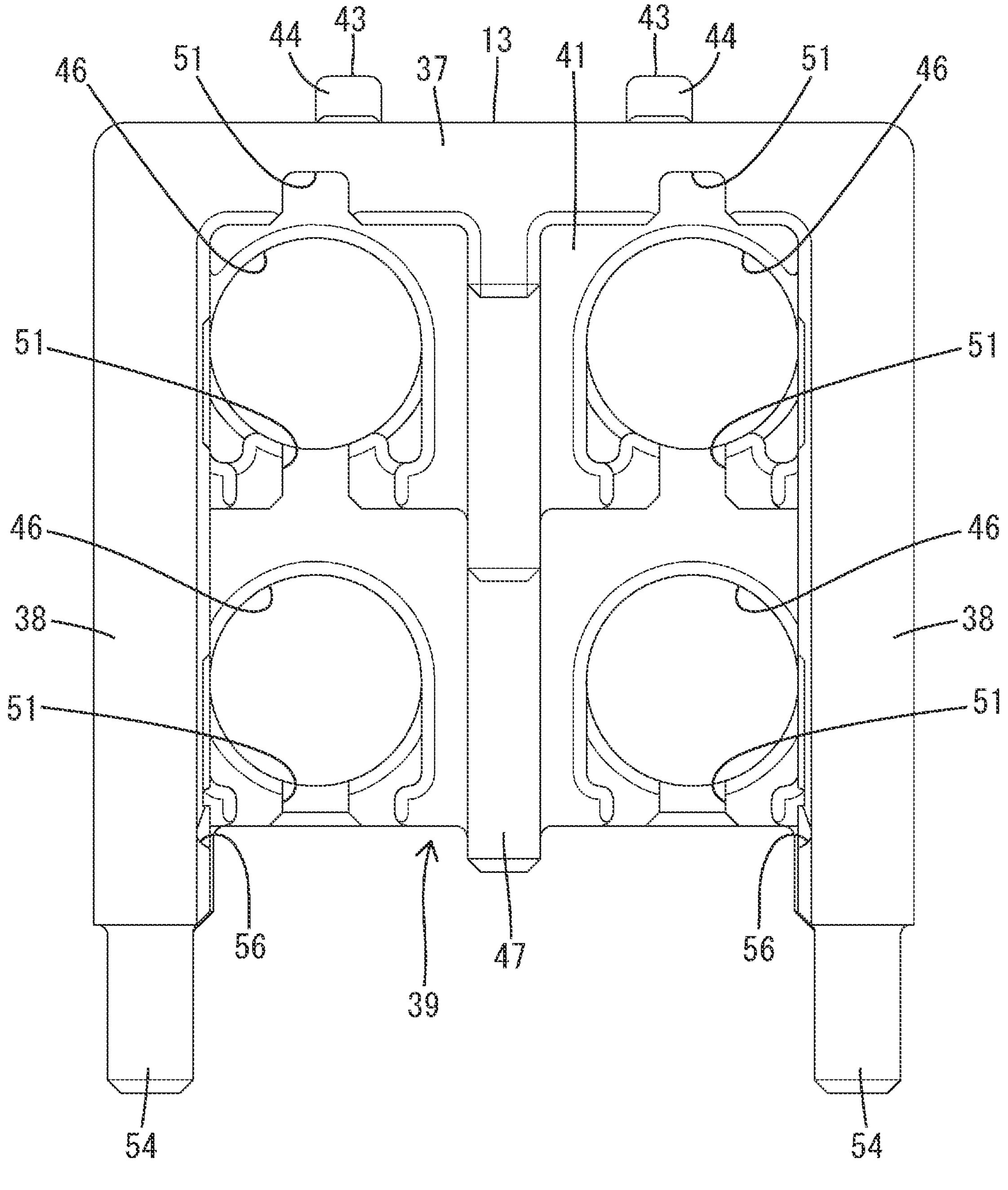
FIG. 20 is a back view of the first outer conductor.

As illustrated in FIG. 18 to FIG. 20, the first outer conductor 13 includes an upper portion 37 having a rectangular shape in plan view, and a pair of side portions 38 protruding downward from both left and right ends of the upper portion 37. As illustrated in FIG. 8 and FIG. 20, the first outer conductor 13 has, among the upper portion 37 and the side portions 38, a fitting receiving portion 39 which is opened downward and backward.

As illustrated in FIG. 20, the first outer conductor 13 includes a mount portion 41 having a shape built up toward the fitting receiving portion 39 while being continuous with the upper portion 37 and the side portions 38. As illustrated in FIG. 18 and FIG. 19, a plurality of the tube portions 42 are formed to protrude on a front surface of the first outer conductor 13. The tube portions 42 are arranged side by side in the width direction on both upper and lower sides. The tube portions 42 are connected to each other vertically and horizontally, and are shaped to be fittable into the fitting recess 23.

The first outer conductor 13 includes a pair of first coupling protruding portions 43 protruding upward from the tube portions 42 on the upper side. The first coupling protruding portions 43 extend over the entire length of the tube portions 42 on the upper side, and are integrally continued to the front surface of the first outer conductor 13. An upper end side of each of the first coupling protruding portions 43 protrudes upward beyond the upper portion 37. As illustrated in FIG. 20, the back surface (the surface facing backward) of the upper end side of the first coupling protruding portions 43 serves as a first outer-conductor-side contact portion 44 extending along the up and down direction and the width direction.

Figure 11:
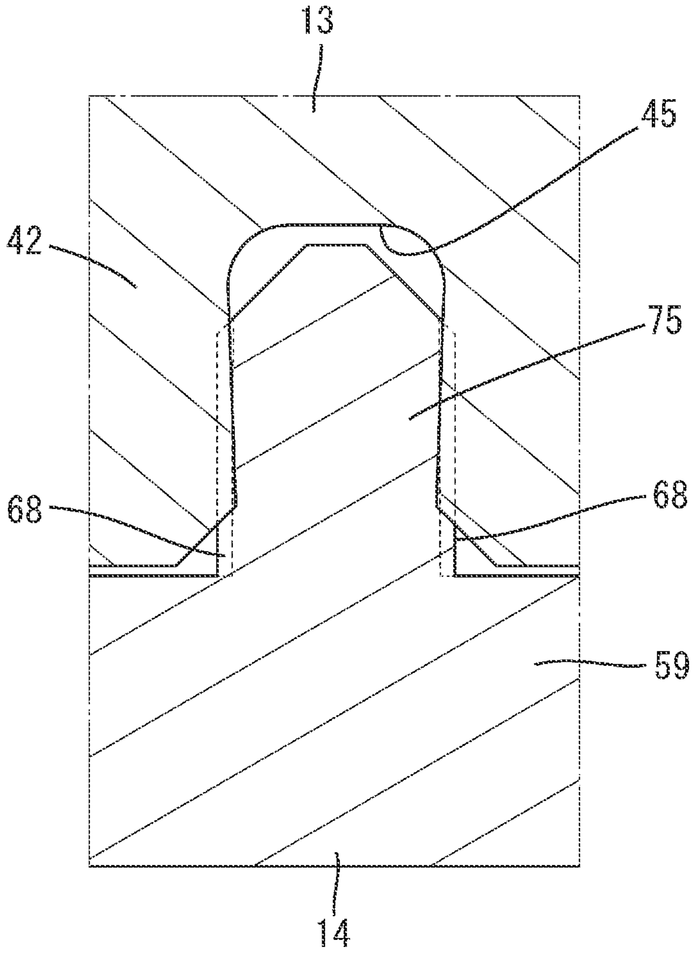
FIG. 11 is a partially enlarged cross-sectional view illustrating a fit state between a press-fit recessed portion and a press-fit protruding portion.

As illustrated in FIG. 18 and FIG. 19, a press-fit recessed portion 45 is formed in a lower end portion of the front surface of the first outer conductor 13. The press-fit recessed portion 45 is disposed between the tube portions 42 on the lower side. Specifically, the press-fit recessed portion 45 is defined by the tube portions 42 on the lower side and a coupling portion connecting the tube portions 42 on the lower side in the width direction, and is opened forward and downward. The back side of the press-fit recessed portion 45 is closed by the front surface of the first outer conductor 13. The press-fit recessed portion 45 has a dovetail groove shape whose width gradually increases from the lower end on the opening side toward the upper end on the innermost side. As illustrated in FIG. 11, a press-fit protruding portion 75, which will be described below, of the second outer conductor 14 is press fit in the press-fit recessed portion 45.

As illustrated in FIG. 20, the mount portion 41 has a plurality of through holes 46 penetrating in the front and back direction. Each of the through holes 46 has a circular cross section, and as illustrated in FIG. 18 and FIG. 19, has a front end portion formed inside a corresponding one of the tube portions 42. In a state where the first outer conductor 13 and the housing 18 are coupled, the tube portions 42 fit in the fitting recess 23 of the housing 18, and the through holes 46 of the mount portion 41 and the insertion holes 22 of the housing body 19 communicate in the front and back direction as illustrated in FIG. 2.

As illustrated in FIG. 8 and FIG. 20, a protrusion portion 47 protruding toward the fitting receiving portion 39 is formed at a center portion of the first outer conductor 13 in the width direction. As illustrated in FIG. 20, the protrusion portion 47 has a plate shape extending along the up and down direction in the mount portion 41, and is disposed between the through holes 46 adjacent to each other in the width direction. The lower end of the protrusion portion 47 forms a stepped shape together with the lower surfaces of the mount portions 41. The through holes 46 on the upper side in the mount portion 41 are formed, according to the stepped shape, to extend backward longer than the through holes 46 on the lower side (see FIG. 2).

As illustrated in FIG. 20, a plurality of groove portions 51 are formed in the first outer conductor 13. The groove portions 51 include ones formed by notching a lower portion of a circumference wall (including a portion of the stepped shape) surrounding the through holes 46 in the mount portion 41, and ones formed as recesses in the inner surface of the back end portion of the upper portion 37. The groove portions 51 are each disposed for a corresponding one of the through holes 46, and are opened to the lower side and the back side which are the fitting receiving portion 39 side.

Figure 3:
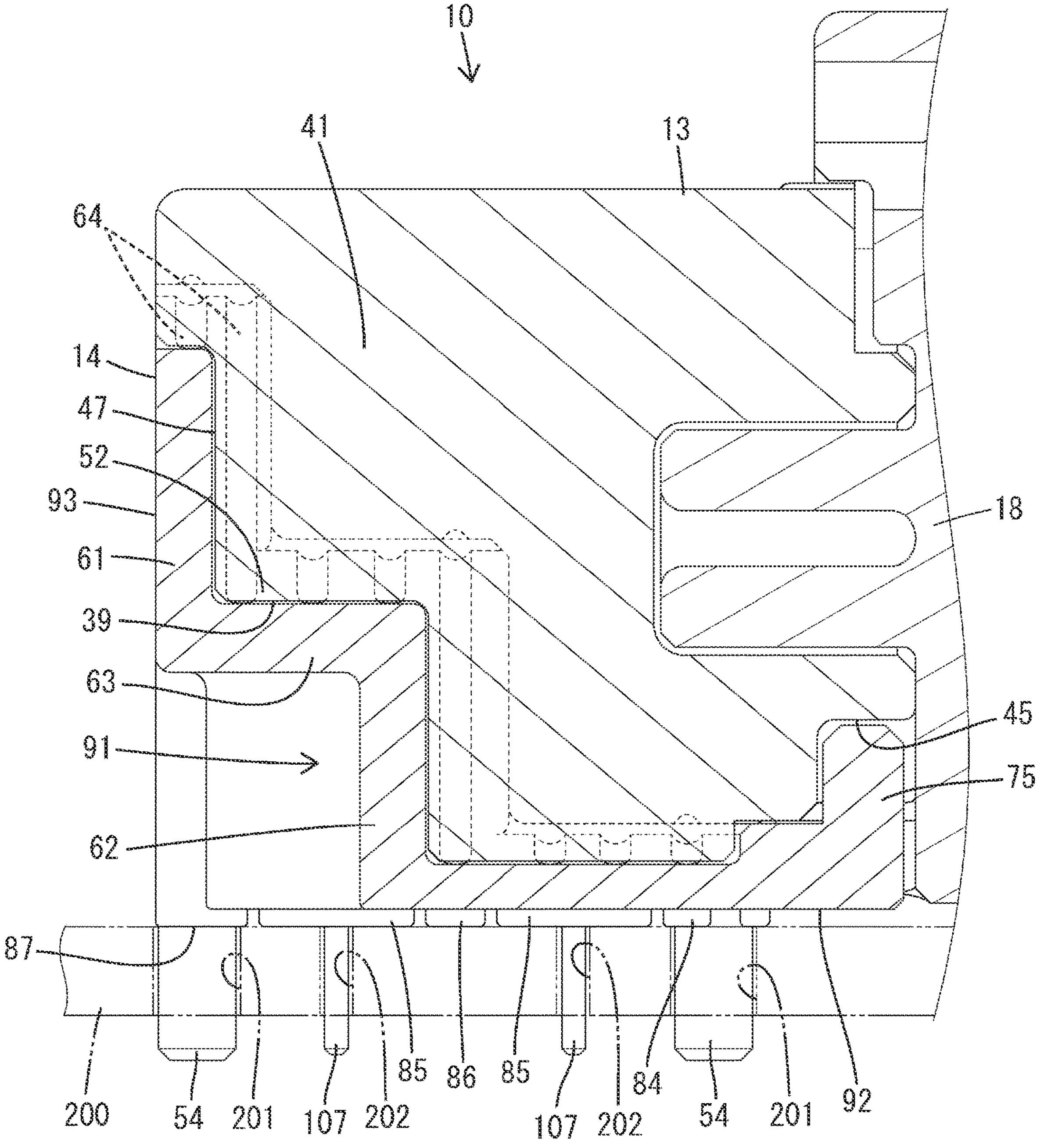
FIG. 3 is a partially enlarged cross-sectional view illustrating an assembled state between a first outer conductor and a second outer conductor.
Figure 12:
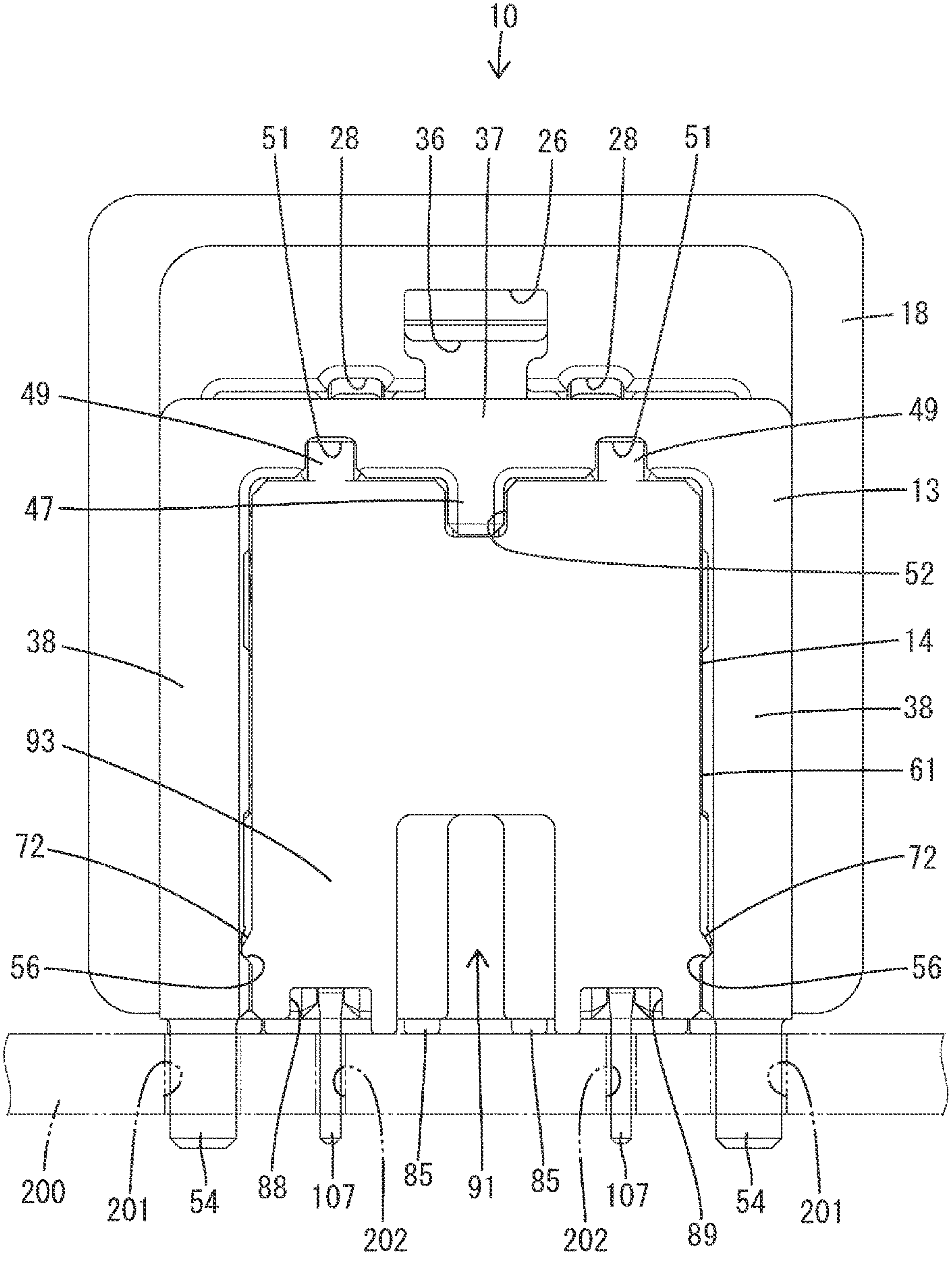
FIG. 12 is a back view of the shield connector mounted on a circuit board.

As illustrated in FIG. 8, four leg portions 54 are formed to protrude downward at front and back end portions of the lower ends of the side portions 38. The leg portions 54 are disposed at positions corresponding to the four corners of the lower end of the first outer conductor 13. As illustrated in FIGS. 2, 3, and 12, each of the leg portions 54 is positioned at a fixing hole 201 of the circuit board 200 and inserted thereinto. As illustrated in FIG. 8, a rib-shaped protrusion portion 48 is formed to protrude downward at an intermediate portion of the lower end of each of the side portions 38 in the front and back direction.

Figure 4:
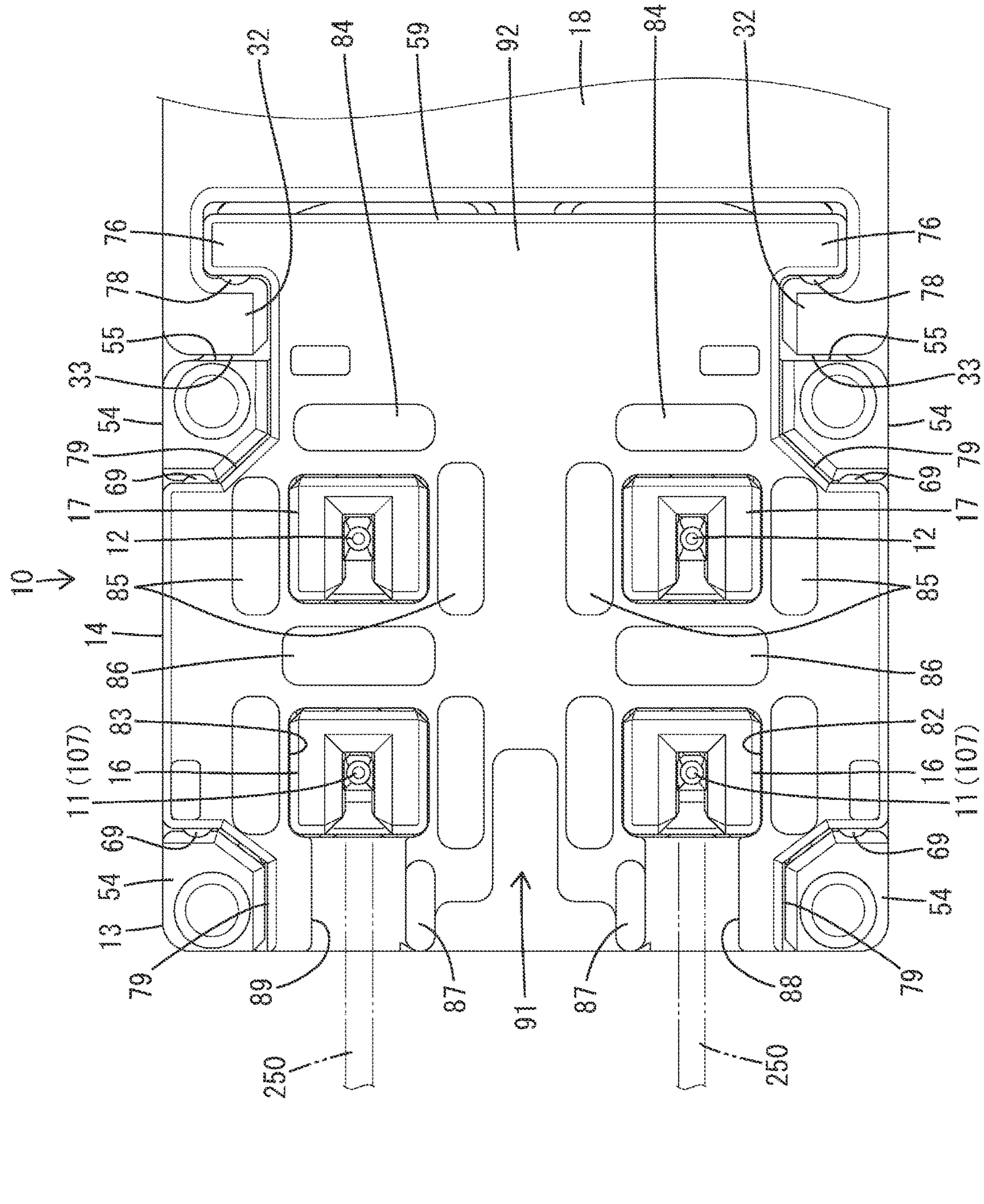
FIG. 4 is a partially enlarged bottom view illustrating a bottom surface of the second outer conductor and a peripheral structure thereof.

As illustrated in FIG. 19, a front surface of an upper portion of each of the leg portions 54 on the front side serves as a displacement restriction surface 55 extending along the width direction. As illustrated in FIG. 4, the displacement restriction surface 55 faces the second locking protrusion 32 of the housing body 19 so as to be contactable with the second housing-side contact portion 33 in a direction of elastic displacement of the second locking protrusion 32.

Figure 9:
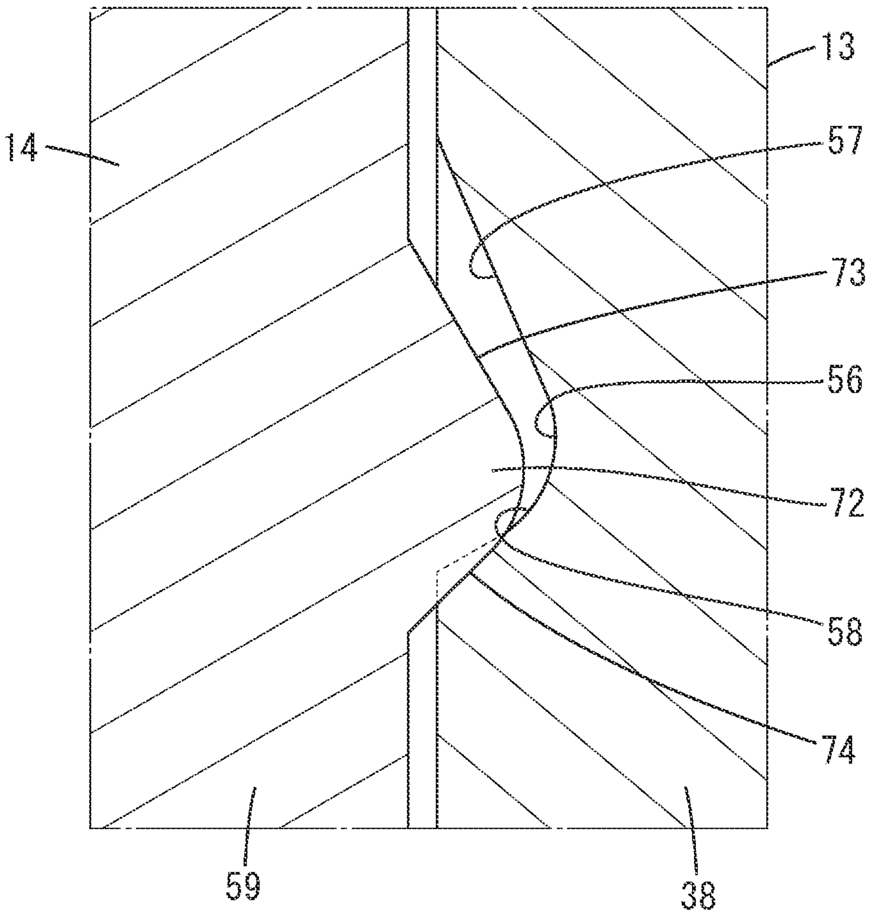
FIG. 9 is a partially enlarged cross-sectional view illustrating a contact state between a contact surface portion of a recessed portion and a contact surface portion of a protruding portion.

As illustrated in FIG. 20, a pair of recessed portions 56 are formed in back side lower end portions of the inner surfaces of the side portions 38 (which are also the inner surfaces of the fitting receiving portion 39). The recessed portions 56 are opened to the inner side in the width direction (the sides where the side portions 38 face each other) and to the back side. As illustrated in FIGS. 6 and 8, the recessed portions 56 are disposed on the upper end side of the leg portions 54 on the back side. As illustrated in FIG. 9, an upper portion of the inner surface of the recessed portion 56 is a gently inclined portion 57 which is gently inclined outward in the width direction with respect to the up and down direction. A lower portion of the inner surface of each recessed portion 56 serves as a contact surface portion 58 inclined outward in the width direction with respect to the up and down direction at an inclination angle larger than that of the gently inclined portion 57. A contact surface portion 74 of a protruding portion 72 of the second outer conductor 14 described below comes into contact with the contact surface portion 58 of a corresponding one of the recessed portions 56 in a wedging manner.

Figure 21:
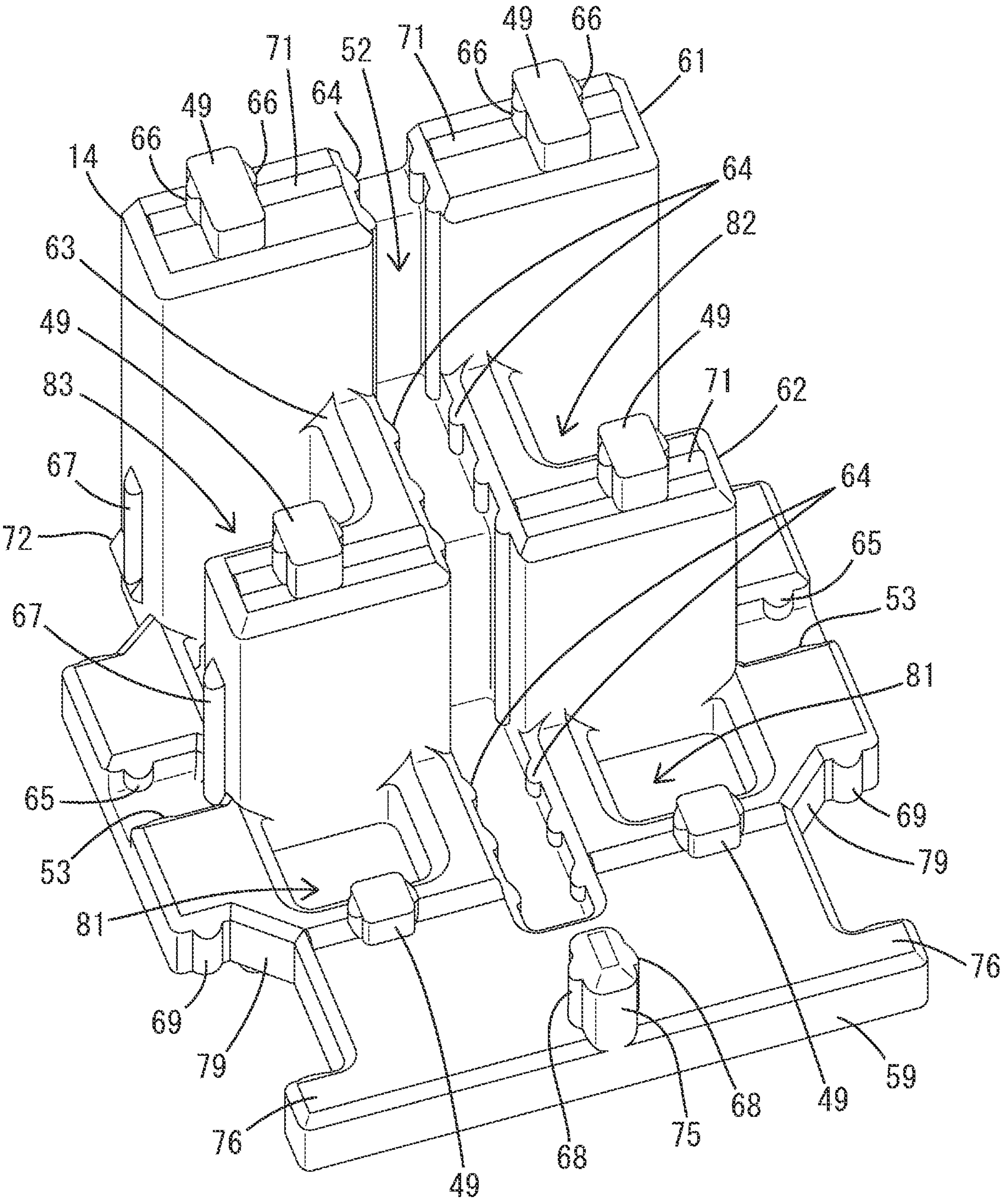
FIG. 21 is a perspective view of the second outer conductor.

As illustrated in FIG. 8, the second outer conductor 14 is assembled to the first outer conductor 13 from the lower side. As illustrated in FIG. 21, the second outer conductor 14 includes: a bottom portion 59 having a rectangular shape in bottom view; a back portion 61 standing from a back end portion of the bottom portion 59; a standing portion 62 that stands from a position of the bottom portion 59 close to the back end portion; and a connecting portion 63 connecting the back portion 61 and the standing portion 62 in a center portion of the bottom portion 59 in the width direction. The back portion 61, the standing portion 62, and the connecting portion 63 are formed as a fitting portion that can be fit in the fitting receiving portion 39 of the first outer conductor 13.

Figure 24:
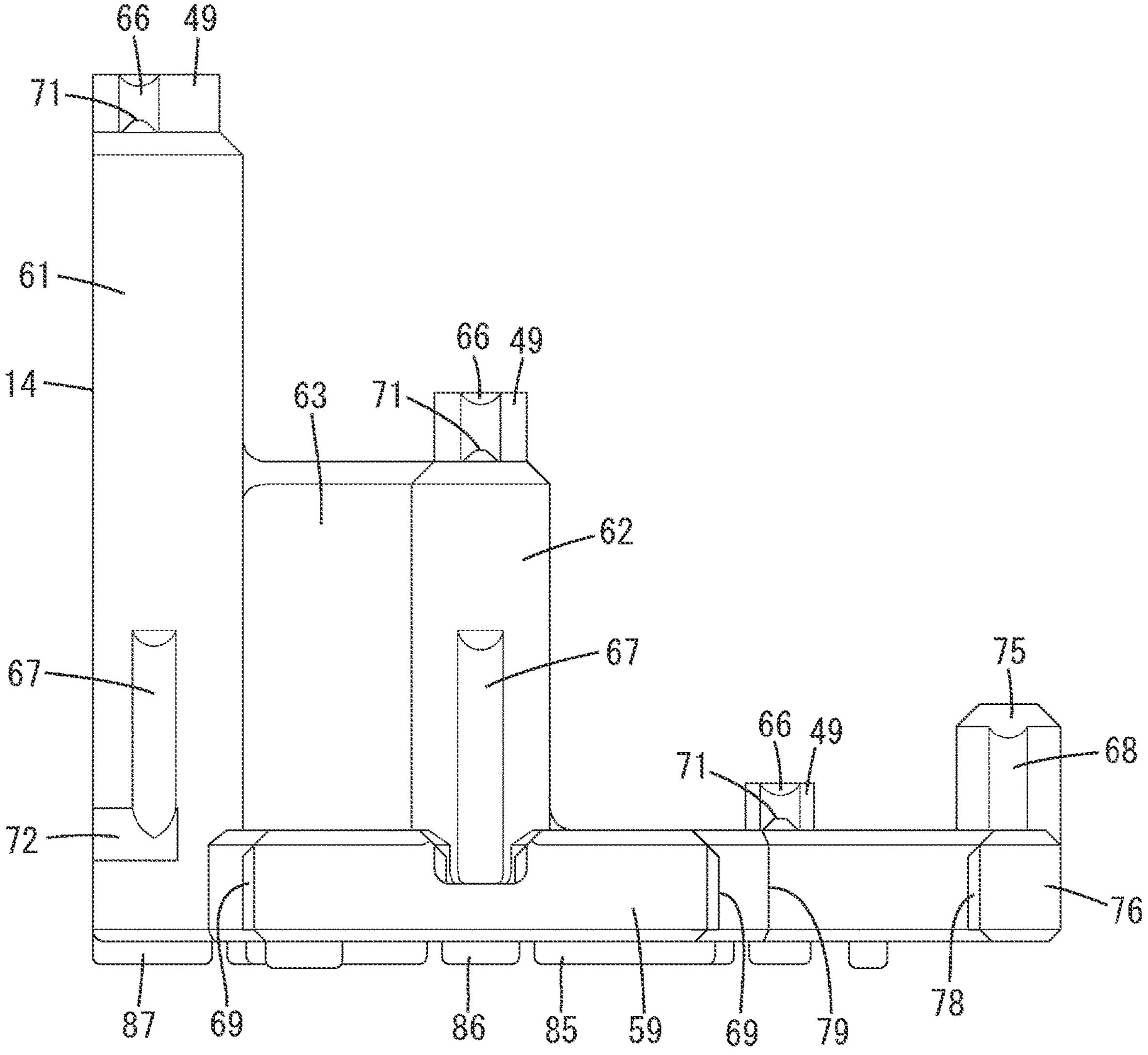
FIG. 24 is a side view of the second outer conductor.

The back portion 61 and the standing portion 62 have a vertical wall shape having a rectangular shape in back view. As illustrated in FIG. 12, the back portion 61 closes the back surface of the first outer conductor 13. As illustrated in FIG. 24, the protruding dimension of the standing portion 62 is smaller than the protruding dimension of the back portion 61. A height difference between the upper end surface of the standing portion 62 and the upper end surface of the back portion 61 corresponds to a height difference of the stepped shape of the mount portion 41. The upper end surface of the standing portion 62 and the upper end surface of the connecting portion 63 are connected to each other at the same height.

Figure 23:
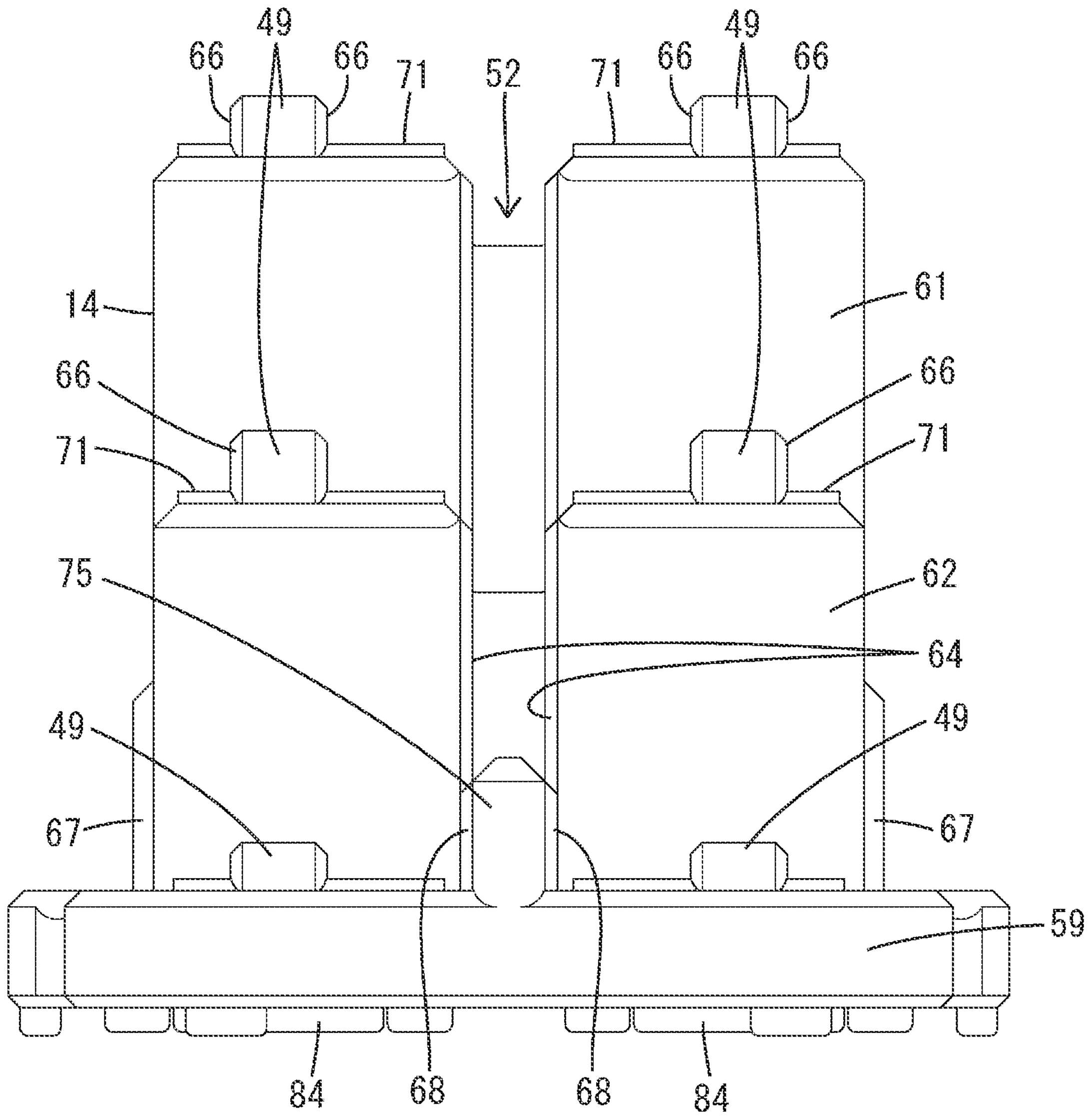
FIG. 23 is a front view of the second outer conductor.
Figure 25:
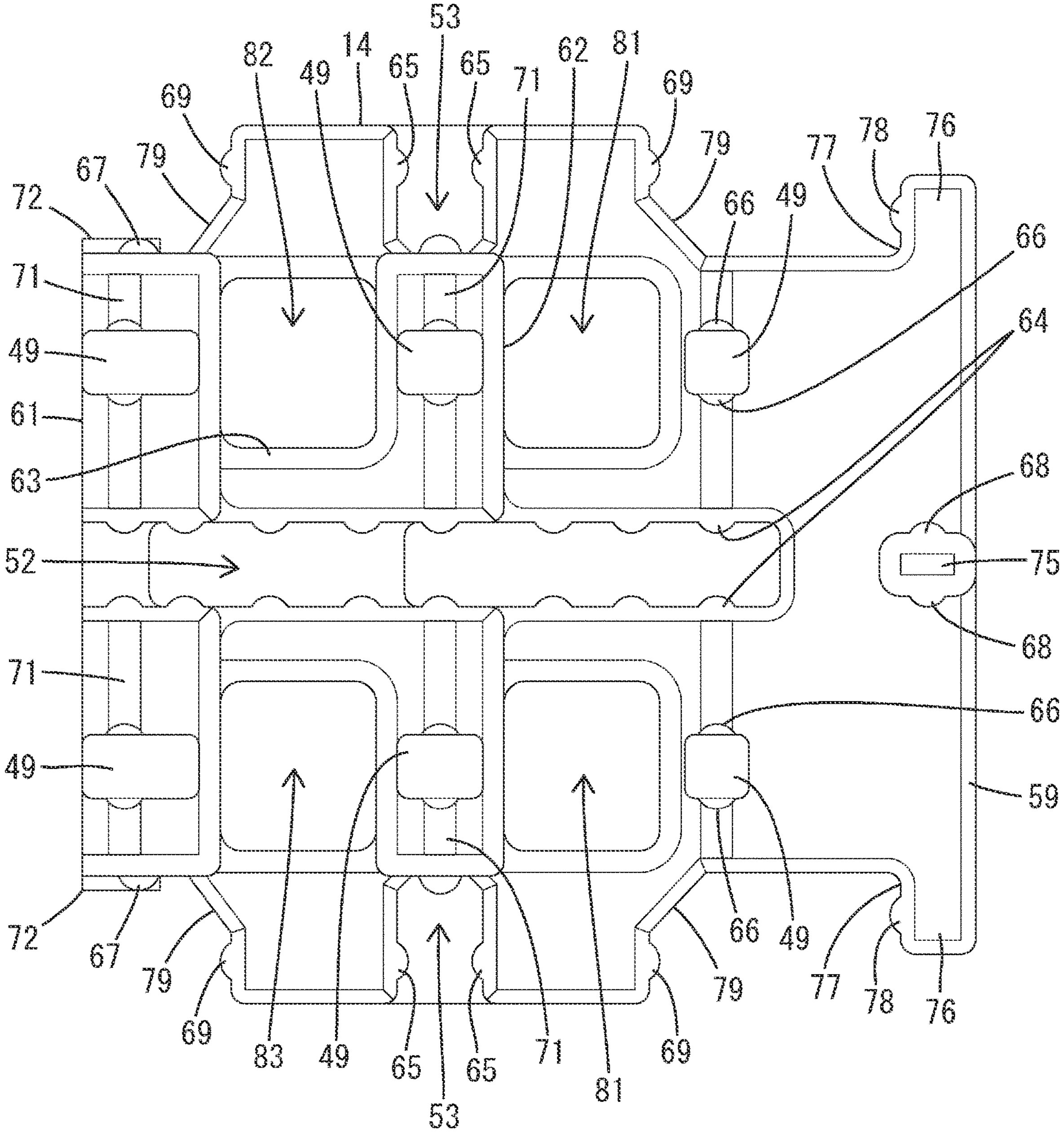
FIG. 25 is a plan view of the second outer conductor.

As illustrated in FIGS. 21, 23, and 25, a groove portion 52 is formed in a center portion of the second outer conductor 14 in the width direction. The groove portion 52 is formed as a recess continuously in a stepped manner on the respective upper surfaces and front surfaces of the back portion 61, of the connecting portion 63, of the standing portion 62, and of the bottom portion 59. Thus, the bottom surface (innermost surface) of the groove portion 52 in the back portion 61 is disposed at a position one step higher than the bottom surface of the groove portion 52 in the connecting portion 63 and the standing portion 62. The bottom surface of the groove portion 52 in the connecting portion 63 and the standing portion 62 is disposed at a position one step higher than the bottom surface of the groove portion 52 in the bottom portion 59.

As illustrated in FIG. 21 and FIG. 25, the groove portion 52 includes a plurality of contact ribs 64 extending in the up and down direction, on both side surfaces facing each other in the width direction. Each of the contact ribs 64 has an arc cross sectional shape. A large number of contact ribs 64 are formed on both side surfaces of the groove portion 52 corresponding to the back portion 61, the connecting portion 63, the standing portion 62, and the bottom portion 59, at an interval in the front and back direction. Furthermore, a groove portion 53 is formed in a center portion of each side surfaces of the bottom portion 59 in the front and back direction. As illustrated in FIG. 25, the groove portion 53 includes contact ribs 65 extending in the up and down direction, on front and back surfaces facing each other in the front and back direction.

As illustrated in FIGS. 21, 23, and 25, a pair of protrusion portions 49 are formed on the upper surface of each of the back portion 61, the standing portion 62, and the bottom portion 59 at both right and left side portions sandwiching the groove portion 52. Each of the protrusion portions 49 has a columnar shape and is arranged in parallel with the groove portion 52. Contact ribs 66 are formed to extend in the up and down direction, also on both side surfaces of the protrusion portions 49. Furthermore, lateral ribs 71 which intersect the contact ribs 66 of the protrusion portions 49 and extend in the left and right direction are formed on the upper surface of each of the back portion 61, the standing portion 62, and the bottom portion 59.

Figure 5:
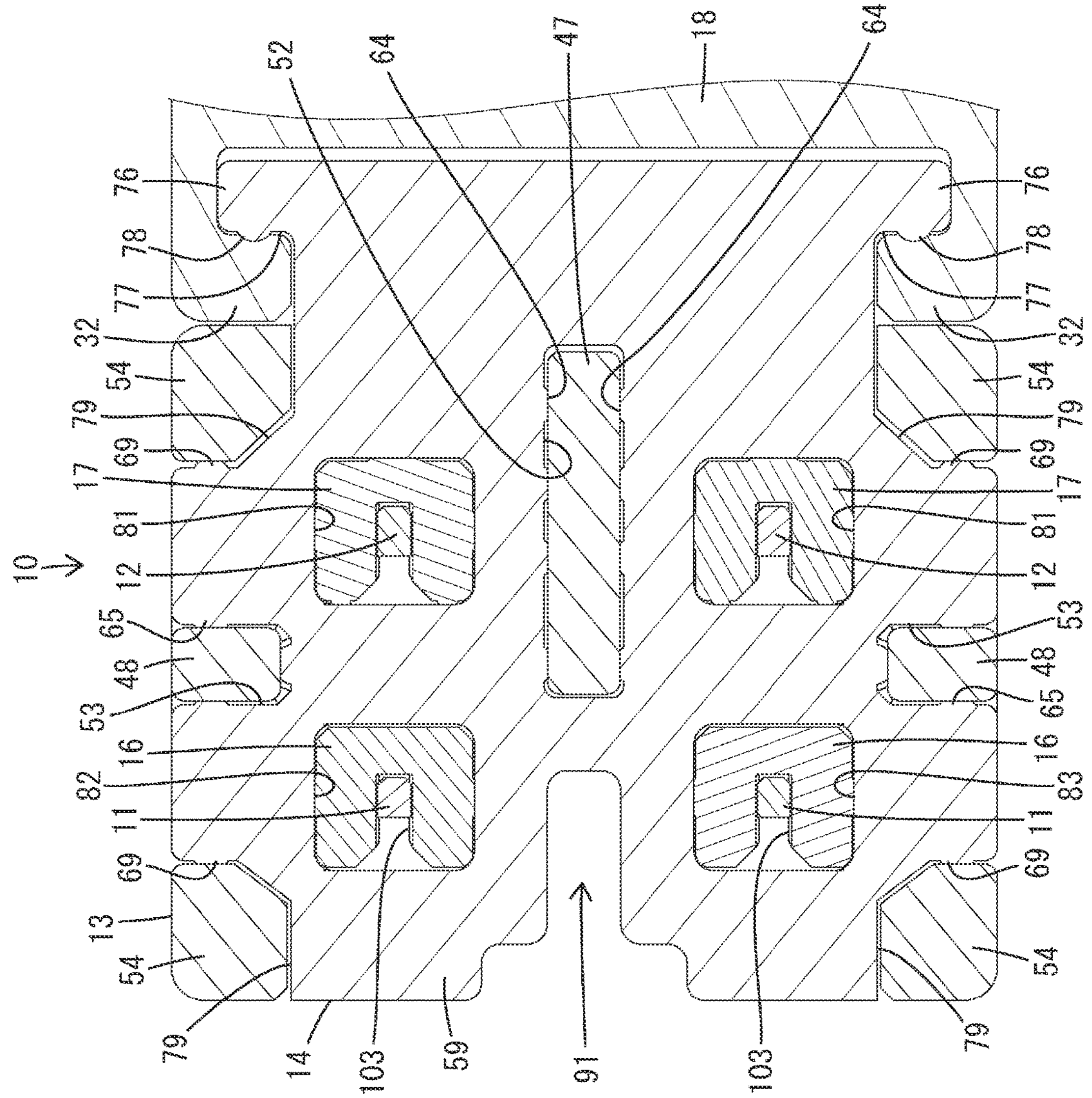
FIG. 5 is a partially enlarged cross-sectional view illustrating a state in which the shield connector is horizontally cut at a position corresponding to a bottom portion.
Figure 22:
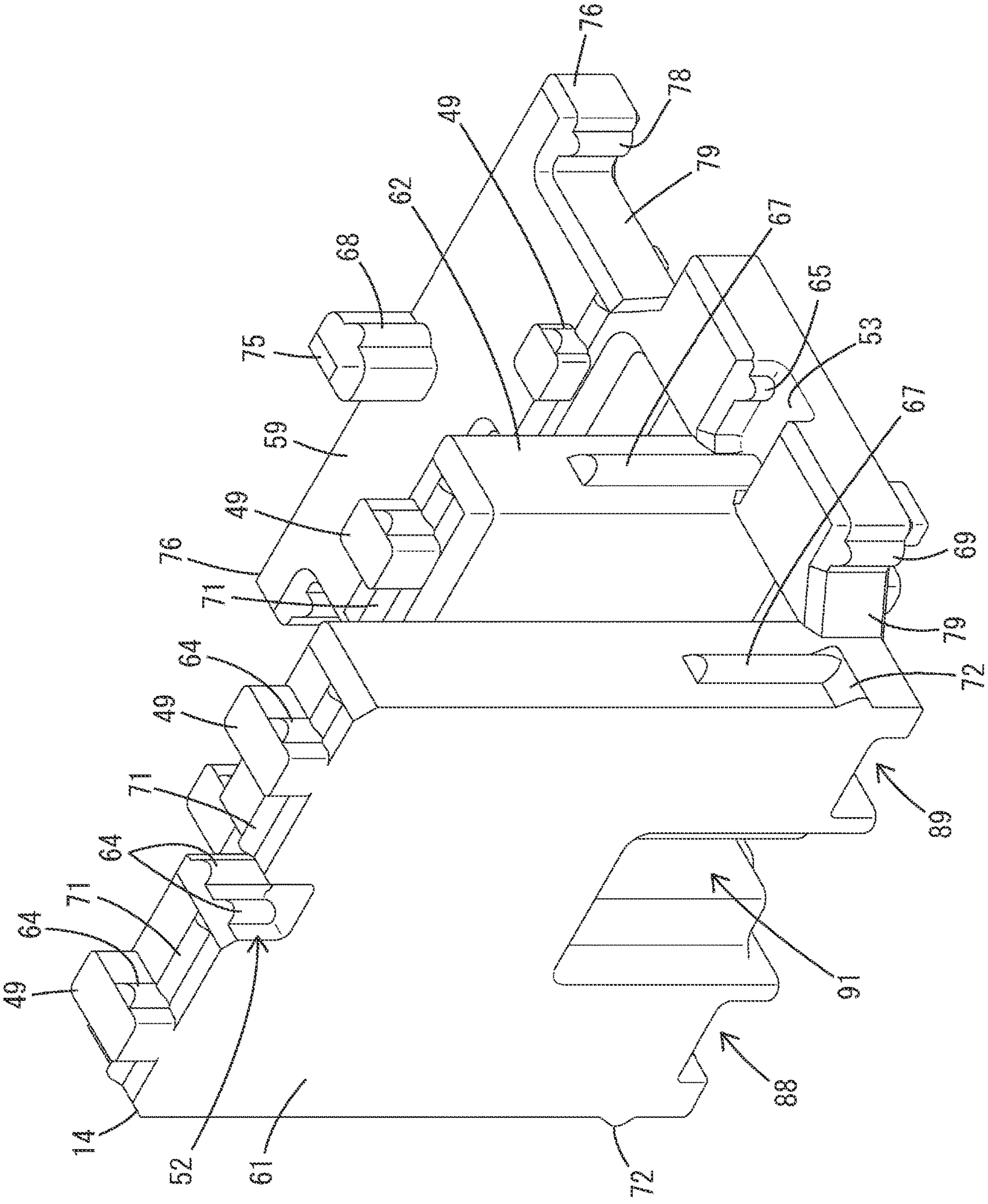
FIG. 22 is a perspective view of the second outer conductor as viewed from a direction different from that of FIG. 21.

In the state where the first outer conductor 13 and the second outer conductor 14 are assembled, the protrusion portions 47 and 48 of the first outer conductor 13 fit in the groove portions 52 and 53 of the second outer conductor 14, as illustrated in FIG. 5. Furthermore, as partially illustrated in FIG. 12, the protrusion portions 49 of the second outer conductor 14 fit in the respective groove portions 51 of the first outer conductor 13. As partially illustrated in FIG. 5, the contact ribs 64, 65, and 66 of the second outer conductor 14 come into contact with both side surfaces (outer surfaces) of the protrusion portions 47 and 48 of the first outer conductor 13 and both side surfaces (inner surfaces) of the groove portions 51 of the first outer conductor 13. Each lateral rib 71 of the second outer conductor 14 comes into contact with the lower surface (surface facing downward) of the first outer conductor 13. Furthermore, as illustrated in FIGS. 21 to 23, contact ribs 67 extending long in the up and down direction are formed on both side surfaces of the back portion 61 and the standing portion 62. The contact ribs 67 come into contact with the inner surfaces of the side portions 38 of the first outer conductor 13.

As illustrated in FIGS. 22 and 25, the second outer conductor 14 has a pair of the protruding portions 72 at lower back end portions of both side surfaces. Each of the protruding portions 72 has an arc cross sectional shape extending in the front and back direction on each side surface of the bottom portion 59. The front end of the protruding portion 72 is integrally connected to the lower end of the contact rib 67 formed on each side surface of the back portion 61. As illustrated in FIG. 9, the upper portion of the outer surface of the protruding portion 72 is an inclined portion 73 which is inclined with respect to the up and down direction, at an inclination angle that is larger than that of the gently inclined portion 57 of the recessed portion 56. A lower portion of the outer surface of the protruding portion 72 is the contact surface portion 74 which is inclined with respect to the up and down direction at an inclination angle that is larger than that of the inclined portion 73. The inclination angle of the contact surface portion 74 of the protruding portion 72 with respect to the up and down direction is set to be smaller than that of the contact surface portion 58 of the recessed portion 56. In the state where the first outer conductor 13 and the second outer conductor 14 are assembled, the protruding portion 72 fits in the lower portion of the recessed portion 56, and the contact surface portion 74 is in contact with the contact surface portion 58 of the recessed portion 56 in a wedged manner.

As illustrated in FIGS. 21 to 25, the press-fit protruding portion 75 is formed to protrude from the center portion of the upper surface of the front end portion of the bottom portion 59 in the width direction. The press-fit protruding portion 75 has a columnar shape and is formed to have the same cross-sectional shape in the up and down direction except for the upper end portion. The press-fit protruding portion 75 is disposed in front of the groove portion 52 in the bottom portion 59. A pair of contact ribs 68 are also formed to extend in the up and down direction, on both side surfaces of the press-fit protruding portion 75. As illustrated in FIG. 11, each contact rib 68 comes into contact with the inner surface of the press-fit recessed portion 45.

As illustrated in FIG. 25, the second outer conductor 14 includes the pair of second coupling protruding portions 76 protruding outward in the width direction from the front ends of the both side surfaces of the bottom portion 59. The back surface (the surface facing backward) of each of the second coupling protruding portions 76 is the second outer-conductor-side contact portion 77 extending along the width direction. In each of the second outer-conductor-side contact portions 77, the pressing rib 78 having an arc cross sectional shape and extending in the up and down direction is formed. As illustrated in FIG. 10, the pressing rib 78 of the second outer-conductor-side contact portion 77 comes into contact with the second housing-side contact portion 33 of the second locking protrusions 32 in a pressed manner.

As illustrated in FIG. 25, notched portions 79 are formed at portions that face the second outer-conductor-side contact portions 77 on the front side of the bottom portion 59, and at left and right corner portions of the back end of the bottom portion 59. Upper end portions of the leg portions 54 fit in the respective notched portions 79. Contact ribs 69 which come into contact with the upper end portions of the leg portions 54 are also formed in the notched portions 79.

As illustrated in FIG. 21 and FIG. 25, a plurality of opening portions 81, 82, and 83 are formed in the second outer conductor 14. The opening portions 81, 82, and 83 each have a rectangular cross-sectional shape, and are disposed at positions on both left and right sides of the groove portion 52 and on front and back sides in the second outer conductor 14. The opening portions 81 on the front side are positioned in front of the standing portion 62 and behind the protrusion portion 49 formed in the bottom portion 59, and are formed through the bottom portion 59 to open in a bottom surface 92 (surface facing downward, see FIG. 8). The opening portions 82 and 83 on the back side are defined by the back portion 61, the standing portion 62, and the connecting portion 63, and are also formed through the bottom portion 59 to open in the bottom surface 92. In the following description, the opening portions on the back side adjacent to each other in the width direction may be referred to as a first opening portion 82 and a second opening portion 83 as appropriate.

As illustrated in FIG. 2, dielectrics 16 and 17 are fit in the opening portions 81, 82, and 83. The inner conductors 11 and 12 attached to the dielectrics 16 and 17 each have a board connection portion 107 described below which protrudes downward through the opening portions 81, 82, and

83, from the bottom surface 92 of the bottom portion 59. Each board connection portion 107 protruding through the first opening portion 82 and the second opening portion 83 is connected to a conductive portion (portion formed in the front end portion of surface layer wiring 250 not illustrated) that is a part of the surface layer wiring 250 formed on the surface of the circuit board 200 (see FIG. 4). On the surface of the circuit board 200, the surface layer wiring 250 is formed to extend backward from a land where the board connection portion 107 is soldered.

As illustrated in FIG. 4, a plurality of mounting portions 84 to 87 are formed in the bottom surface 92 of the bottom portion 59 to surround the peripheries of the opening portions 81, 82, and 83. Each of the mounting portions 84 to 87 slightly protrudes downward from the bottom surface 92 of the bottom portion 59. A lower end surface of each of the mounting portions 84 to 87 has a flat shape, and is connected to a grounding conductive portion of the circuit board 200 by soldering.

Specifically, the mounting portions include: front side mounting portions 84 extending in the left and right direction on the front side of the opening portions 81 on the front side; side mounting portions 85 extending in the front and back direction on both left and right sides of the opening portions 81, 82, and 83; and common mounting portions 86 extending in the left and right direction between the opening portions 81 on the front side and the opening portions 82 and 83 on the back side. Furthermore, complementary mounting portions 87 serving as the mounting portions are also formed at positions corresponding to the back sides of the first opening portion 82 and the second opening portion 83.

Figure 13:
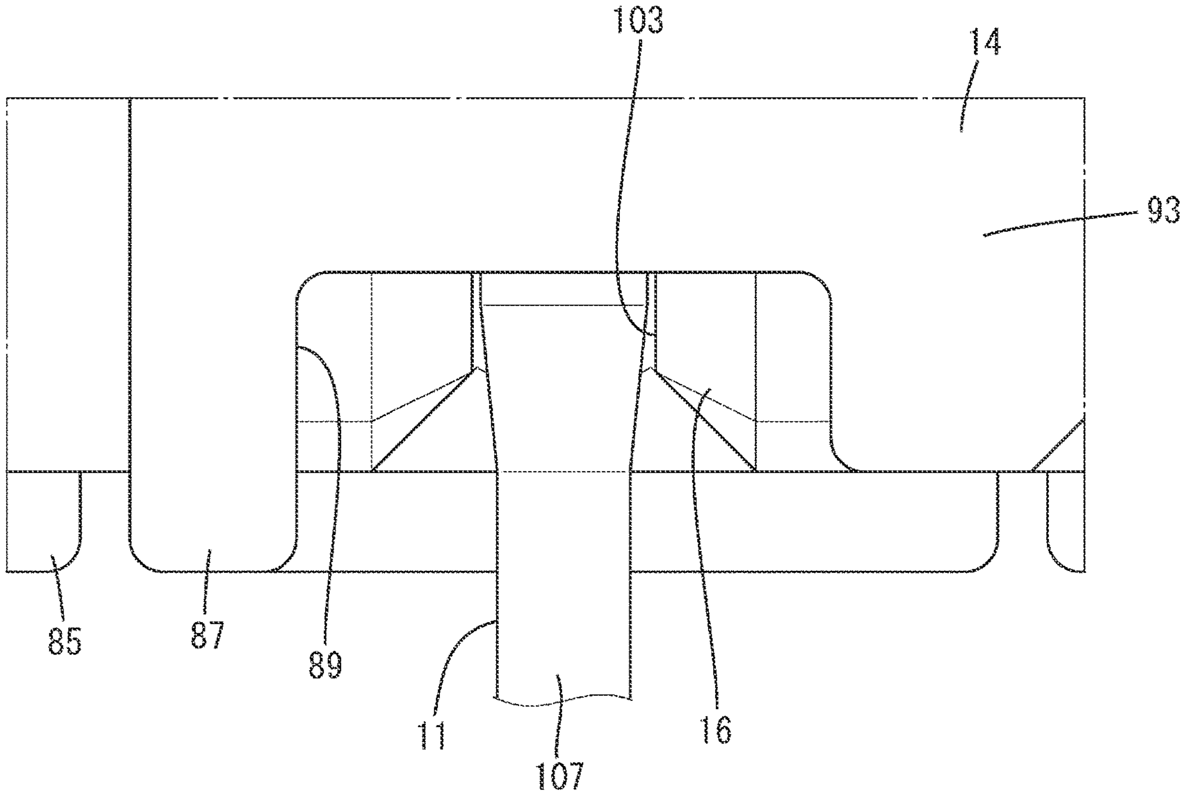
FIG. 13 is a partially enlarged back view illustrating a retraction recessed portion and a peripheral structure thereof.

Retraction recessed portions 88 and 89 are formed as recesses in the back end portion of the bottom surface 92 of the bottom portion 59. The retraction recessed portions include: a first retraction recessed portion 88 extending backward from back edge portion of the first opening portion 82 (an opening edge portion on the back side); and a second retraction recessed portion 89 extending backward from a back edge portion of the second opening portion 83. As illustrated in FIG. 12 and FIG. 22, the back ends of the retraction recessed portions 88 and 89 are open in a back surface 93 intersecting the bottom surface 92 of the second outer conductor 14. The retraction recessed portions 88 and 89 have a rectangular cross-sectional shape, communicate with the opening portions 82 and 83 on the front side, are opened backward and downward, and are closed at the upper side by the back portion 61. As illustrated in FIG. 13, the board connection portion 107 of the inner conductor 11 and a lower end portion of the dielectric 16 can be seen through the retraction recessed portions 88 and 89 (the retraction recessed portion 89 in FIG. 13) in back view of the shield connector 10.

The retraction recessed portions 88 and 89 are disposed above the surface layer wiring 250 of the circuit board 200 (see FIG. 4). The retraction recessed portions 88 and 89 prevent the second outer conductor 14 from coming into electrical connection with the surface layer wiring 250.

The complementary mounting portions 87 are formed between the first retraction recessed portion 88 and the second retraction recessed portion 89 to correspond to the retraction recessed portions 88 and 89. Specifically, the complementary mounting portions 87 are formed to extend in the front and back direction along inner side edges, of both side edges of the first retraction recessed portion 88 and the second retraction recessed portion 89, positioned on the center side of the bottom portion 59 in the width direction.

A recessed depression portion 91 is formed as a recess in a center portion of the back surface 93 of the second outer conductor 14 in the width direction. As illustrated in FIG. 22, the recessed depression portion 91 is formed in the back surface 93 of the second outer conductor 14 so as to extend in the up and down direction from the bottom portion 59 to the back portion 61. The recessed depression portion 91 is open across the bottom surface 92 and the back surface 93 of the second outer conductor 14, and is opened backward and downward. As illustrated in FIG. 3, the inner surfaces of the recessed depression portion 91 are arranged to be parallel to the groove portion 52 at a back-to-back position with the upper surface of the connecting portion 63, the upper surface of the standing portion 62, and the front surface of the standing portion 62. The thickness of the connecting portion 63 is reduced at a portion corresponding to the recessed depression portion 91. As illustrated in FIG. 4, the complementary mounting portions 87 are disposed in the bottom surface 92 of the bottom portion 59 to be sandwiched between the retraction recessed portions 88 and 89 and the recessed depression portion 91 in the width direction.

The outer conductor tube 15 is integrally formed by performing bending or the like on a conductive metal plate, and made thinner than the first outer conductor 13 and the second outer conductor 14. As illustrated in FIG. 1, the outer conductor tube 15 includes: a cylindrical connection body 94 extending in the front and back direction; and a pair of side pieces 95 protruding downward from both left and right sides of the back end portion of the connection body 94.

As illustrated in FIG. 2, the outer conductor tube 15 is inserted into the through hole 46 of the first outer conductor 13 from the back side. A plurality of the outer conductor tubes 15, the number of which is four in the present first embodiment, is provided to correspond to the respective through holes 46, and formed to have the same shape as illustrated in FIG. 1. As illustrated in FIG. 1, a pair of left and right press fit blades 96 are formed in the outer circumference surface of the connection body 94. The side pieces 95 are stopped by abutment against the back end opening edge of each of the through holes 46 of the mount portion 41, the press fit blades 96 are engaged with the inner surface of each of the through holes 46, and thereby the outer conductor tube 15 is held in the first outer conductor 13 in the retained state.

Dielectric

As illustrated in FIG. 1, each of the dielectrics 16 and 17 includes: a cylindrical tubular portion 101 extending in the front and back direction; and a lead-out portion 102 protruding downward from a back end portion of the tubular portion 101, and is formed to have an L shape in side view. Horizontal portions 104, which will be described below, of the inner conductors 11 and 12 are inserted into the tubular portions 101. A guide groove 103 extending the up and down direction is formed in the back surface of the lead-out portion 102. The guide groove 103 is opened backward. As illustrated in FIG. 2, extension portions 105, which will be described below, of the inner conductors 11 and 12 are fit into the guide grooves 103 from the back side.

In a state of being inserted in the respective connection bodies 94 of the outer conductor tubes 15, the tubular portions 101 of the dielectrics 16 and 17 are disposed in the through holes 46 of the first outer conductor 13. The lead-out portions 102 of the dielectrics 16 and 17 are inserted in the opening portions 81, 82, and 83 of the second outer conductor 14.

As illustrated in FIG. 1, the dielectrics include two types of dielectrics 16 and 17, which have long and short dimensions, respectively. The long dielectrics 16 are held by the outer conductors 13, 14, and 15 with the tubular portions 101 disposed in the through holes 46 on the upper side, and the lead-out portions 102 inserted in the opening portions 82 and 83 on the back side. The short dielectrics 17 are held by the outer conductors 13, 14, and 15 with the tubular portions 101 disposed in the through holes 46 on the lower side, and the lead-out portions 102 inserted in the opening portions 81 on the front side.

Inner Conductor

As illustrated in FIG. 1, each of the inner conductors 11 and 12 is a pin-shaped terminal that includes: the horizontal portion 104 extending in the front and back direction; and the extension portion 105 extending downward from the back end portion of the horizontal portions 104, and is formed to have an L shape in side view. The horizontal portion 104 includes a mating connection portion 106 protruding forward from the tubular portion 101 in a state of being inserted in the tubular portion 101 of each of the dielectrics 16 and 17. As illustrated in FIG. 2, the mating connection portion 106 protrudes into the hood 21 and is electrically connected to a mating inner conductor 303 in a fit state between the housing 18 and the mating connector 300. The extension portion 105 includes the board connection portion 107 which protrudes downward from the lead-out portion 102 in a state of being inserted in the guide groove 103 of the lead-out portion 102 of each of the dielectrics 16 and 17. The board connection portion 107 is formed to have a smaller diameter than the upper portion of the extension portion 105.

As illustrated in FIG. 1, the inner conductors include two types of inner conductors 11 and 12, which have long and short dimensions, respectively. The long inner conductor 11 is held by the long dielectric 16. The short inner conductor 12 is held by the short dielectric 17.

Assembly method and operation of shield connector First of all, the horizontal portion 104 of each of the inner conductors 11 and 12 is inserted and held in the tubular portion 101 of a corresponding one of the dielectrics 16 and 17 from the back side (see FIG. 2). The extension portions 105 of the inner conductors 11 and 12 are disposed to be exposed on the back surface side of the lead-out portions 102, in a state of the being inserted in the guide grooves 103. Next, the tubular portion 101 of each of the dielectrics 16 and 17 is inserted into the connection body 94 of the corresponding outer conductor tube 15 from the back side and held therein. Then, the connection body 94 of each of the outer conductor tubes 15 is inserted into the corresponding through hole 46 of the first outer conductor 13 from the back side and held therein. As illustrated in FIG. 6, the front end portion of the connection body 94 of the outer conductor tube 15 protrudes forward from the tube portion 42 of the first outer conductor 13. Alternatively, an operation of inserting the dielectrics 16 and 17 into the outer conductor tubes 15 may be performed after an operation of inserting the outer conductor tubes 15 into the first outer conductor 13.

Subsequently, the first outer conductor 13 is coupled to the housing 18 from the back side (see FIG. 6). In the process of coupling of the first outer conductor 13, the first coupling protruding portions 43 climb over the first locking protrusions 28 to be fit in the fitting holes 27. When the coupling of the first outer conductor 13 is completed, the tube portions 42 come into contact with the innermost surface of the fitting recess 23, so that the operation of coupling the first outer conductor 13 is stopped, and the first coupling protruding portions 43 are press fit in the recessed grooves 25. As illustrated in FIGS. 2 and 7, the first housing-side contact portion 29 and the first outer-conductor-side contact portion 44 are in contact with each other while facing each other in the front and back direction. The first coupling protruding portions 43 are press fit in the recessed grooves 25, so that the first outer-conductor-side contact portions 44 and the first housing-side contact portions 29 firmly contact each other and this contact state can be maintained.

Next, the second outer conductor 14 is assembled to the first outer conductor 13 from the lower side (see FIG. 8). At the end of the process of assembling the second outer conductor 14, the inclined portion 73 of the protruding portion 72 interferes with the side portion 38. As a result, the side portion 38 is somewhat bent and deformed outward in the width direction with the upper portion 37 side serving as the fulcrum. When the assembly of the second outer conductor 14 is completed, the protrusion portions 47 and 48 of the first outer conductors 13 come into contact with the bottom surfaces of the groove portions 52 and 53 of the second outer conductor 14, so that the assembly operation of the second outer conductor 14 is stopped, and furthermore, restoring force acts on the side portions 38, so that each of the protruding portions 72 fits in the recessed portion 56 and the contact surface portion 74 of the protruding portion 72 comes into contact with the contact surface portion 58 of the recessed portion 56 as illustrated in FIG. 9. Here, since a lap margin is provided between the contact surface portion 74 of the protruding portion 72 and the contact surface portion 58 of the recessed portion 56, the contact surface portions 58 and 74 firmly contact each other and this contact state can be maintained.

Even if the vibration force in the up and down direction is applied to the first outer conductor 13 and the second outer conductor 14, the contact state between the contact surface portion 58 of the recessed portion 56 and the contact surface portion 74 of the protruding portion 72 is maintained, so that the reliability of the electrical connection between the first outer conductor 13 and the second outer conductor 14 can be ensured. As illustrated in FIG. 12, the fit state between the recessed portion 56 and the protruding portion 72 is visible in back view.

When the assembly of the second outer conductor 14 is completed, the press-fit protruding portion 75 is fit into the press-fit recessed portion 45 from the lower side, and as illustrated in FIG. 11, the contact ribs 68 of the press-fit protruding portion 75 come into contact with the inner surface of the press-fit recessed portion 45 on the opening side, in a collapsed state. Thus, the contact state between the contact surface portions 58 and 74 is maintained on the back end side, the contact state between the press-fit protruding portion 75 and the press-fit recessed portion 45 is maintained on the front end side, so that the second outer conductor 14 is stably held without inclining in the front and back direction with respect to the first outer conductor 13.

When the assembly of the second outer conductor 14 is completed, as illustrated in FIG. 10, the second coupling protruding portion 76 is fit in the fitting groove 34 of the housing 18, the pressing rib 78 of the second outer-conductor-side contact portion 77 comes into contact with the second housing-side contact portion 33 in a wedged manner, and the second outer-conductor-side contact portion 77 is held by the housing 18 in a retained state. The leg portions 54 of the first outer conductor 13 are fit in the respective notched portions 79 of the bottom portion 59. Here, the displacement restriction surface 55 of the leg portion 54 on the front side is disposed in the vicinity of the back surface of the second locking protrusions 32 on the opposite side to the second housing-side contact portion 33, so as to be contactable with the back surface. Even if a foreign matter or the like interferes with the second locking protrusion 32 of the housing 18 to thereby make the second locking protrusion 32 displaced in an expanding manner toward the outer side in the width direction, the displacement of the second locking protrusion 32 can be prevented because the displacement restriction surface 55 of the first outer conductor 13 faces in the direction of the displacement. As a result, the assembled state of the second housing-side contact portion 33 and the second outer-conductor-side contact portion 77 is maintained, so that rattling between the outer conductors 13, 14, and 15 and the housing 18 can be prevented.

When the assembly of the second outer conductor 14 is completed, the back portion 61, the standing portion 62, and the connecting portion 63 as the fitting portion of the second outer conductor 14 are fit in the fitting receiving portion 39 of the first outer conductor 13 (see FIG. 3), the protrusion portions 49 of the second outer conductor 14 are fit in the respective groove portions 51 of the first outer conductor 13 (see FIG. 12), and the protrusion portions 47 and 48 of the first outer conductor 13 are respectively fit in the groove portions 52 and 53 of the second outer conductor 14 (see FIG. 5). The contact ribs 64 to 69 of the second outer conductor 14 are brought into contact with the corresponding surfaces such as the inner surfaces of the groove portions 51 of the first outer conductor 13 and the outer surfaces of the protrusion portions 47 and 48, in a collapsed state. As a result, a large number of electrical connection structures (contact structures) are formed between the first outer conductor 13 and the second outer conductor 14 via the contact ribs 64 to 69. Thus, the reliability of the electrical connection between the first outer conductor 13 and the second outer conductor 14 can be improved.

The contact ribs 64 to 69 are in contact with the corresponding surfaces along the up and down direction. Therefore, even if vibration force in the up and down direction is applied to the first outer conductor 13 and the second outer conductor 14, the contact state of the contact ribs 64 to 69 can be maintained. In particular, in the case of the present first embodiment, a large number of the contact ribs 64 to 69 are formed on the inner surfaces of the groove portions 52 and 53 and the outer surfaces of the protrusion portions 49 of the second outer conductor 14, the protrusion portions 49 of the second outer conductor 14 are fit in the respective groove portions 51 of the first outer conductor 13, and the protrusion portions 47 and 48 of the first outer conductor 13 are fit in the respective groove portions 52 and 53 of the second outer conductor 14. Thus, each of the contact ribs 64 to 69 can reliably be in contact with the corresponding surface.

In the assembled state of the first outer conductor 13 and the second outer conductor 14, as illustrated in FIG. 2, the standing portion 62 is disposed to cover the outer conductor tube 15 disposed in the through hole 46 on the lower side, the short dielectric 17, and the short inner conductor 12, from the back side. The back portion 61 is disposed to cover the outer conductor tube 15 disposed in the through hole 46 on the upper side, the long dielectric 16, and the long inner conductor 11, from the back side. The extension portions 105 of the inner conductors 11 and 12 are surrounded by the outer conductors 13, 14, and 15 over the entire circumference, except for the board connection portions 107. Thus, the assembly of the shield connector 10 is completed.

Subsequently, the shield connector 10 is installed on the surface of the circuit board 200 (see FIG. 2). The board connection portions 107 of the inner conductors 11 and 12 are inserted in connection holes 202 of the circuit board 200, the leg portions 54 of the first outer conductor 13 are inserted in the fixing holes 201 of the circuit board 200, and the mounting portions 84 to 87 are placed on lands of the conductive portion of the circuit board 200. In this state, through reflow soldering, the board connection portions 107 of the inner conductors 11 and 12 are soldered to conductive portions for signals in the connection hole 202 of the circuit board 200. The leg portions 54 are soldered and fixed in the fixing holes 201, and the mounting portions 84 to 87 are connected to the conductive portion for grounding by soldering.

As illustrated in FIG. 4, the inner conductors 11 and 12 are surrounded by the plurality of mounting portions 84 to 87 on the bottom surface 92 of the second outer conductor 14. Therefore, crosstalk between the inner conductors 11 and 12 adjacent to each other in the width direction and the front and back direction is prevented. The surface layer wiring 250 is formed on the circuit board 200 to extend backward from the positions corresponding to the first opening portion 82 and the second opening portion 83. On the other hand, in the bottom surface 92 of the second outer conductor 14, the first retraction recessed portion 88 is formed behind the first opening portion 82, and the second retraction recessed portion 89 is formed behind the second opening portion 83. With this configuration, the surface layer wiring 250 extending backward from the position corresponding to the first opening portion 82 can be prevented from coming into electrical contact with the second outer conductor 14 by the first retraction recessed portion 88. Furthermore, the surface layer wiring 250 extending backward from the position corresponding to the second opening portion 83 can be prevented from coming into electrical contact with the second outer conductor 14 by the second retraction recessed portion 89. As a result, electromagnetic field coupling between the outer conductors 13 and 14 and the surface layer wiring 250 can be prevented.

The complementary mounting portions 87 serving as the mounting portions extending in the front and back direction along the inner side edge of the retraction recessed portions 88 and 89 are formed between the first retraction recessed portion 88 and the second retraction recessed portion 89. Thus, the crosstalk between the long inner conductors 11 disposed in the first opening portion 82 and the second opening portion 83 can be reliably prevented.

Other Preferred Embodiments of Present Disclosure

The above first embodiment disclosed herein should be construed as being illustrative in all respects and not limiting.

In the first embodiment described above, the protrusion portions are formed in both the first outer conductor and the second outer conductor. Alternatively, according to another embodiment, the protrusion portion may be formed only in one of the first outer conductor and the second outer conductor.

In the first embodiment described above, the contact ribs are formed in both the outer surface of the protrusion portion and the inner surface of the groove portion. Alternatively, according to another embodiment, the contact rib may be formed only on one of the outer surface of the protrusion portion and the inner surface of the groove portion.

In the first embodiment described above, the contact ribs are formed in the second outer conductor only. According to another embodiment, the contact rib may be formed in the first outer conductor, or may be formed in both the first outer conductor and the second outer conductor.

In the first embodiment described above, the recessed portions are formed on the inner surface of the fitting receiving portion of the first outer conductor, and the protruding portions are formed on the outer surface of the fitting portion of the second outer conductor. Alternatively, according to another embodiment, the recessed portion may be formed on the outer surface of the fitting portion of the second outer conductor, and the protruding portion may be formed on the inner surface of the fitting receiving portion of the first outer conductor.

In the first embodiment described above, the outer conductor includes the first outer conductor, the second outer conductor, and the outer conductor tube. Alternatively, according to another embodiment, the outer conductor may include the first outer conductor and the second outer conductor, and may not include the outer conductor tube. For example, a tubular portion corresponding to the connection body of the outer conductor tube may be integrally formed with the first outer conductor.

What is claimed is:

1. A shield connector comprising:

an inner conductor;

an outer conductor that surrounds the inner conductor;

a dielectric that is disposed between the inner conductor and the outer conductor; and a housing coupled to the outer conductor, wherein the outer conductor includes an outer-conductor-side contact portion that is disposed behind the housing and faces backward in a coupled state with the housing, the housing includes a housing-side contact portion that faces forward in the coupled state with the outer conductor, the outer-conductor-side contact portion and the housing-side contact portion contact each other in the coupled state between the outer conductor and the housing, the outer conductor includes a first outer conductor and a second outer conductor assembled to each other, the first outer conductor and the second outer conductor include a first outer-conductor-side contact portion and a second outer-conductor-side contact portion, respectively, both of which serve as the outer-conductor-side contact portion, the housing includes a first housing-side contact portion and a second housing-side contact portion that serve as the housing-side contact portion and correspond to the first outer-conductor-side contact portion and the second outer-conductor-side contact portion, respectively, the first outer conductor is coupled to the housing from a back side, and the second outer conductor is coupled to the housing in a direction intersecting a front and back direction.

2. The shield connector according to claim 1, wherein the second outer-conductor-side contact portion includes a pressing rib that is provided on a surface facing the second housing-side contact portion and comes into contact with the second housing-side contact portion.

3. The shield connector according to claim 1, wherein the first outer conductor includes a displacement restriction surface that faces the second housing-side contact portion in a direction in which the second housing-side contact portion is separated from the second outer-conductor-side contact portion.

4. The shield connector according to claim 2, wherein the first outer conductor includes a displacement restriction surface that faces the second housing-side contact portion in a direction in which the second housing-side contact portion is separated from the second outer-conductor-side contact portion.

* * * * *